United States Patent
Sevin et al.

(10) Patent No.: US 11,425,768 B2
(45) Date of Patent: Aug. 23, 2022

(54) UNIQUE DIRECT LINK SESSION ID TO DRIVE STATIONS IN A WIRELESS NETWORK

(71) Applicant: CANON KABUSHIKI KAISHA, Tokyo (JP)

(72) Inventors: Julien Sevin, Saint Aubin du Cormier (FR); Stéphane Baron, Le Rheu (FR); Pascal Viger, Janze (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/257,250

(22) PCT Filed: Jul. 5, 2019

(86) PCT No.: PCT/EP2019/068138
§ 371 (c)(1),
(2) Date: Dec. 30, 2020

(87) PCT Pub. No.: WO2020/008048
PCT Pub. Date: Jan. 9, 2020

(65) Prior Publication Data
US 2021/0235524 A1    Jul. 29, 2021

(30) Foreign Application Priority Data
Jul. 6, 2018 (GB) ..................................... 1811175

(51) Int. Cl.
*H04W 76/11* (2018.01)
*H04W 76/14* (2018.01)
(Continued)

(52) U.S. Cl.
CPC ....... *H04W 76/14* (2018.02); *H04W 52/0206* (2013.01); *H04W 74/006* (2013.01); *H04W 84/12* (2013.01)

(58) Field of Classification Search
CPC combination set(s) only.
See application file for complete search history.

(56) References Cited

U.S. PATENT DOCUMENTS

2007/0104180 A1* 5/2007 Aizu ................ H04L 29/06027
370/352
2014/0153415 A1* 6/2014 Choudhury ............ H04B 7/024
370/252
(Continued)

FOREIGN PATENT DOCUMENTS

EP          2933932 A1    10/2015

OTHER PUBLICATIONS

Klaus Doppler, et al., Device-to-Device Communication, Mobile and Wireless Communications for IMT-Advanced and Beyond, First Edition, 2011, pp. 207-229, John Wiley & Sons, Ltd., XP007922714.

*Primary Examiner* — Cindy Trandai
(74) *Attorney, Agent, or Firm* — Canon U.S.A., Inc. IP Division

(57) ABSTRACT

A Direct Link (DiL) sessions in wireless networks, and more particularly to an efficient signaling of pairs of DiL-involved stations to control the latter. The present disclosure finds application in enhanced multi-user (MU) uplink (UL) protocols in wireless networks that allow non-UL transmissions to be performed simultaneously with triggered MU UL transmissions, as well as in station power saving management. As will be described in more detail herein, a station may send a trigger frame triggering MU transmissions with an appropriate signaling to allow non-UL transmissions, in particular DiL transmission to another triggered station, in a DiL resource unit of the MU transmission.

18 Claims, 10 Drawing Sheets

(51) Int. Cl.
  *H04W 52/02*  (2009.01)
  *H04W 74/00*  (2009.01)
  *H04W 84/12*  (2009.01)

(56) References Cited

U.S. PATENT DOCUMENTS

| | | | |
|---|---|---|---|
| 2014/0269419 A1* | 9/2014 | Han | H04L 25/03866 370/254 |
| 2014/0334392 A1* | 11/2014 | Gage | H04L 5/0092 370/329 |
| 2015/0004901 A1* | 1/2015 | Agiwal | H04W 76/11 455/39 |
| 2015/0085791 A1* | 3/2015 | Baghel | H04W 76/14 370/329 |
| 2015/0312753 A1* | 10/2015 | Asterjadhi | H04W 4/00 370/329 |
| 2016/0057703 A1* | 2/2016 | Benoit | H04W 56/00 370/311 |
| 2016/0249397 A1 | 8/2016 | Seok | |
| 2016/0316391 A1* | 10/2016 | Calcev | H04W 72/042 |
| 2018/0227847 A1* | 8/2018 | Butt | H04W 52/0216 |
| 2018/0270756 A1* | 9/2018 | Bhattad | H04W 76/27 |
| 2019/0020644 A1* | 1/2019 | Asai | H04L 63/08 |
| 2020/0053647 A1* | 2/2020 | Chae | H04W 56/001 |
| 2021/0368444 A1* | 11/2021 | Wang | H04W 72/0446 |

* cited by examiner

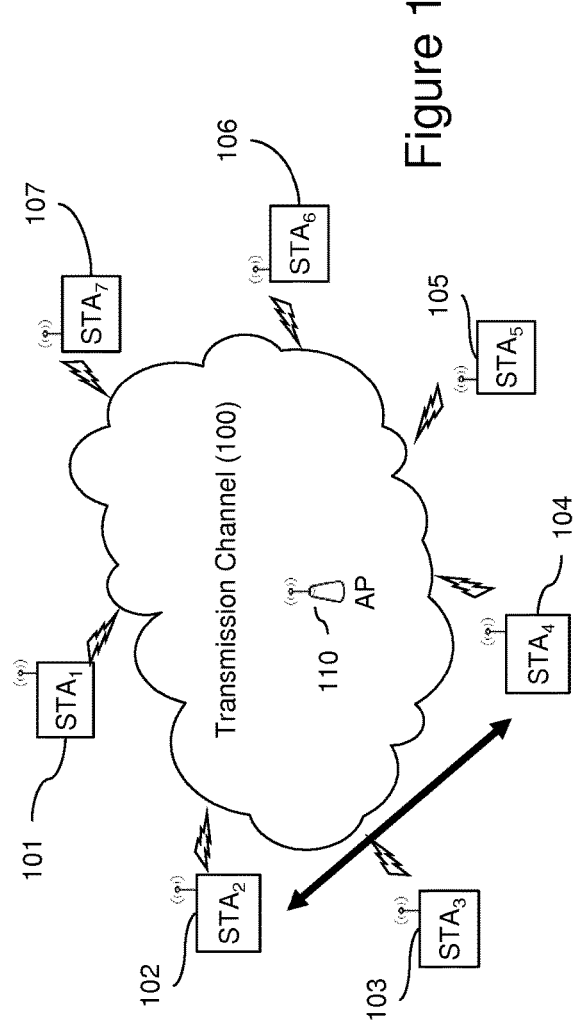
Figure 1
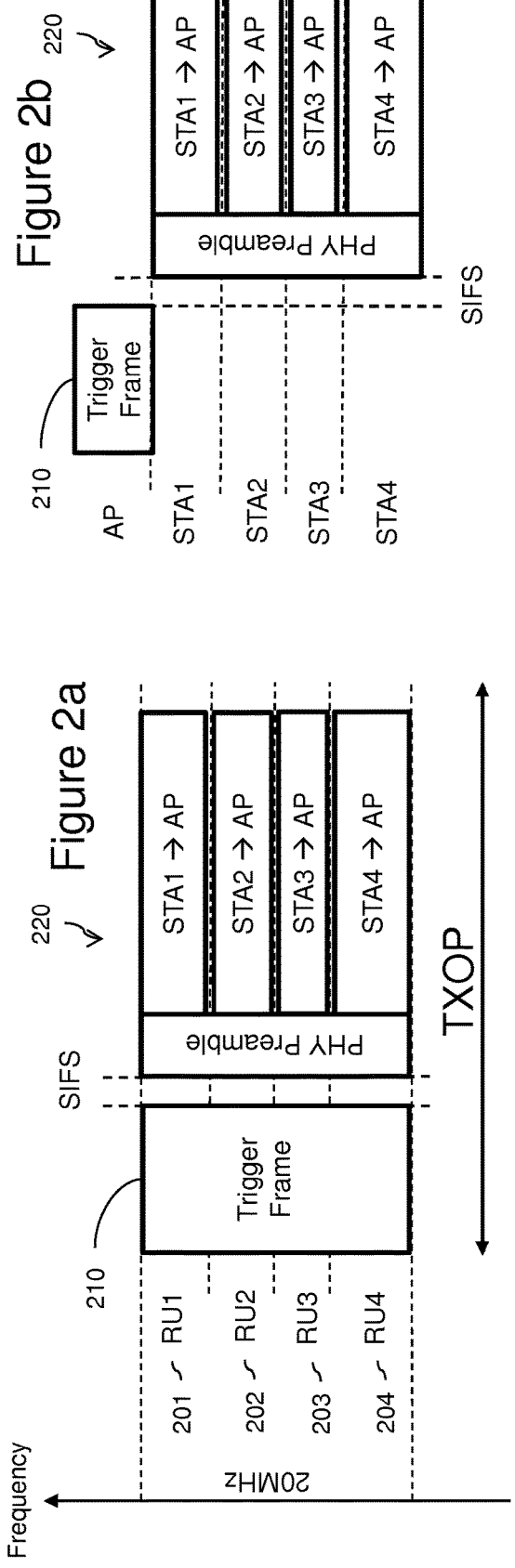
Figure 2a
Figure 2b

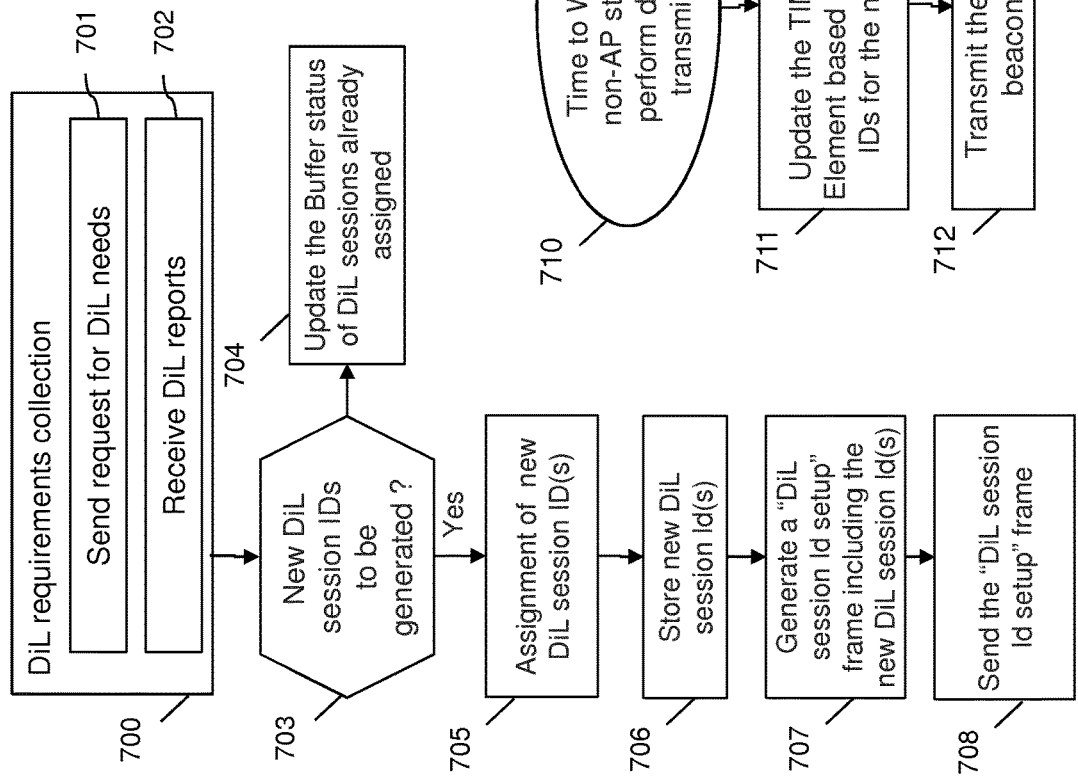
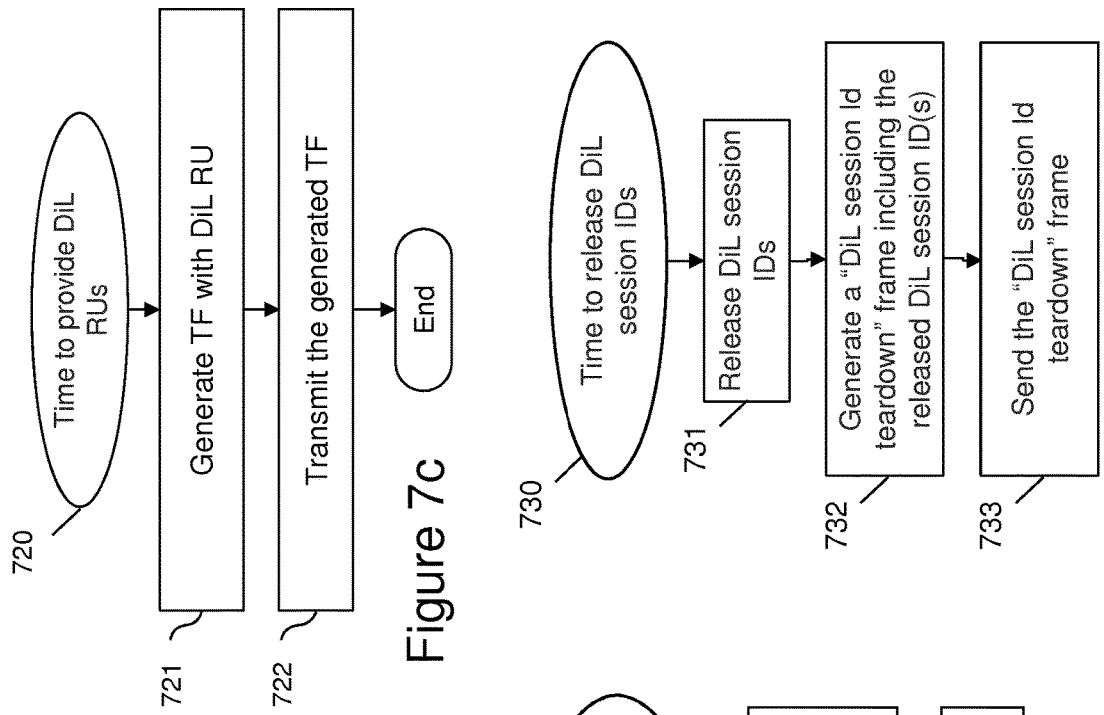
Figure 7c
Figure 7d
Figure 7b
Figure 7a

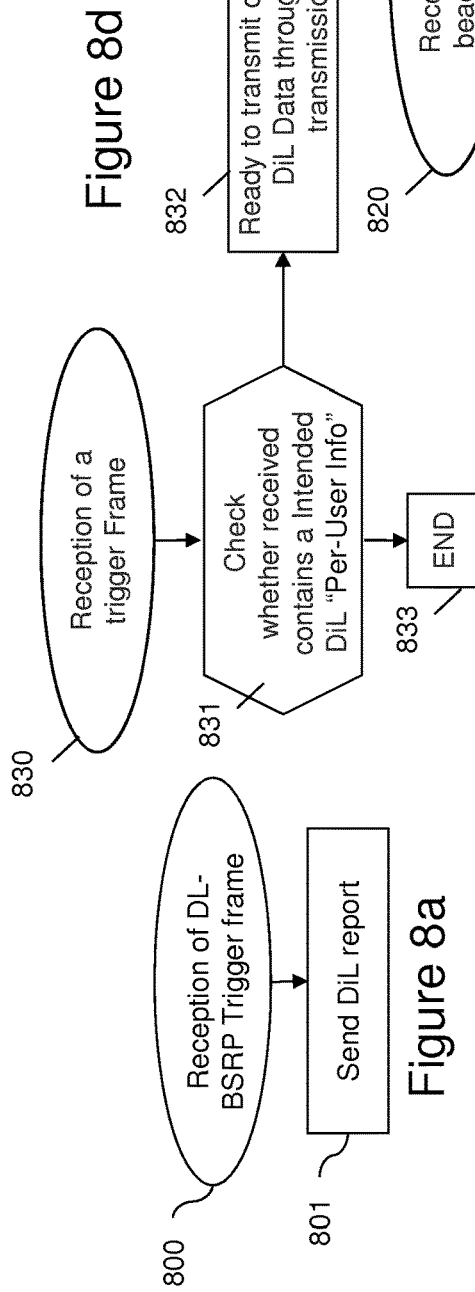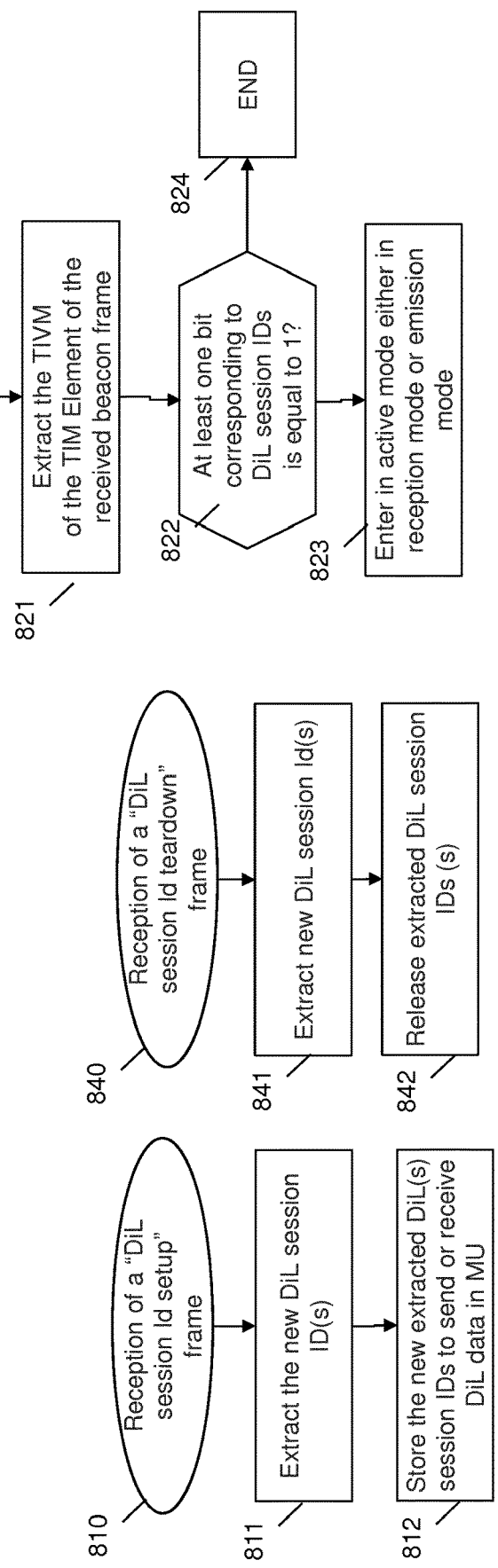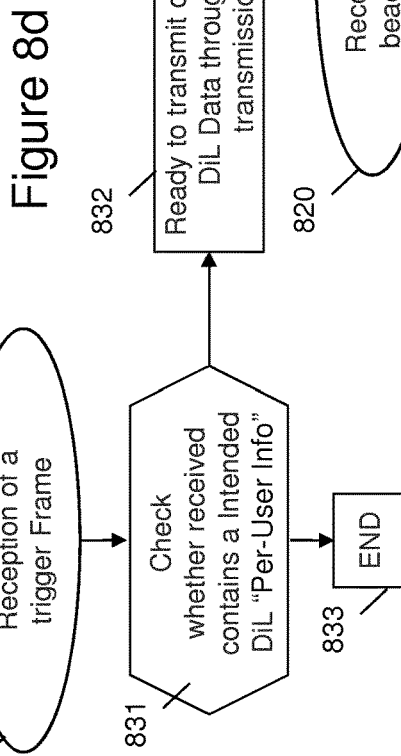

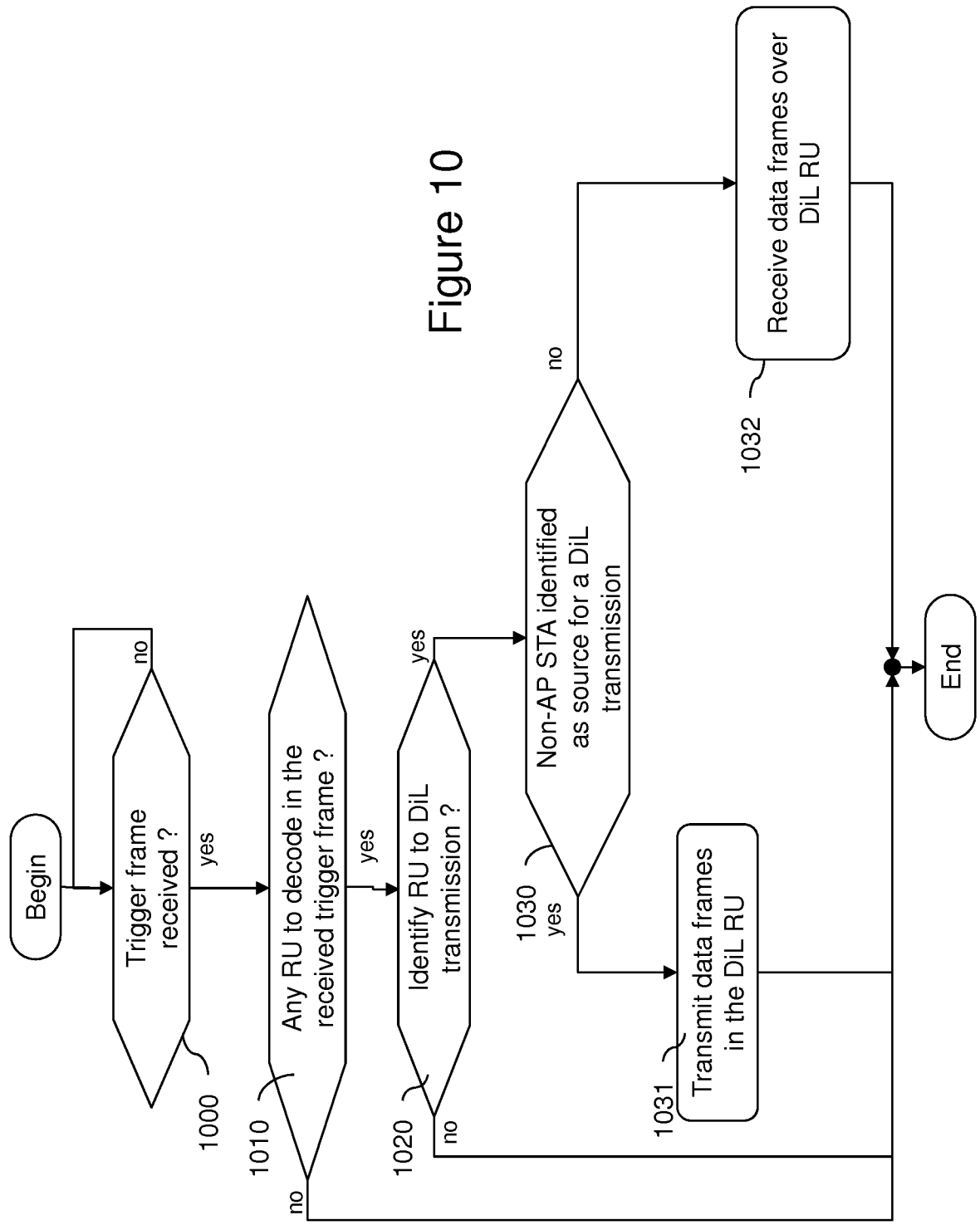

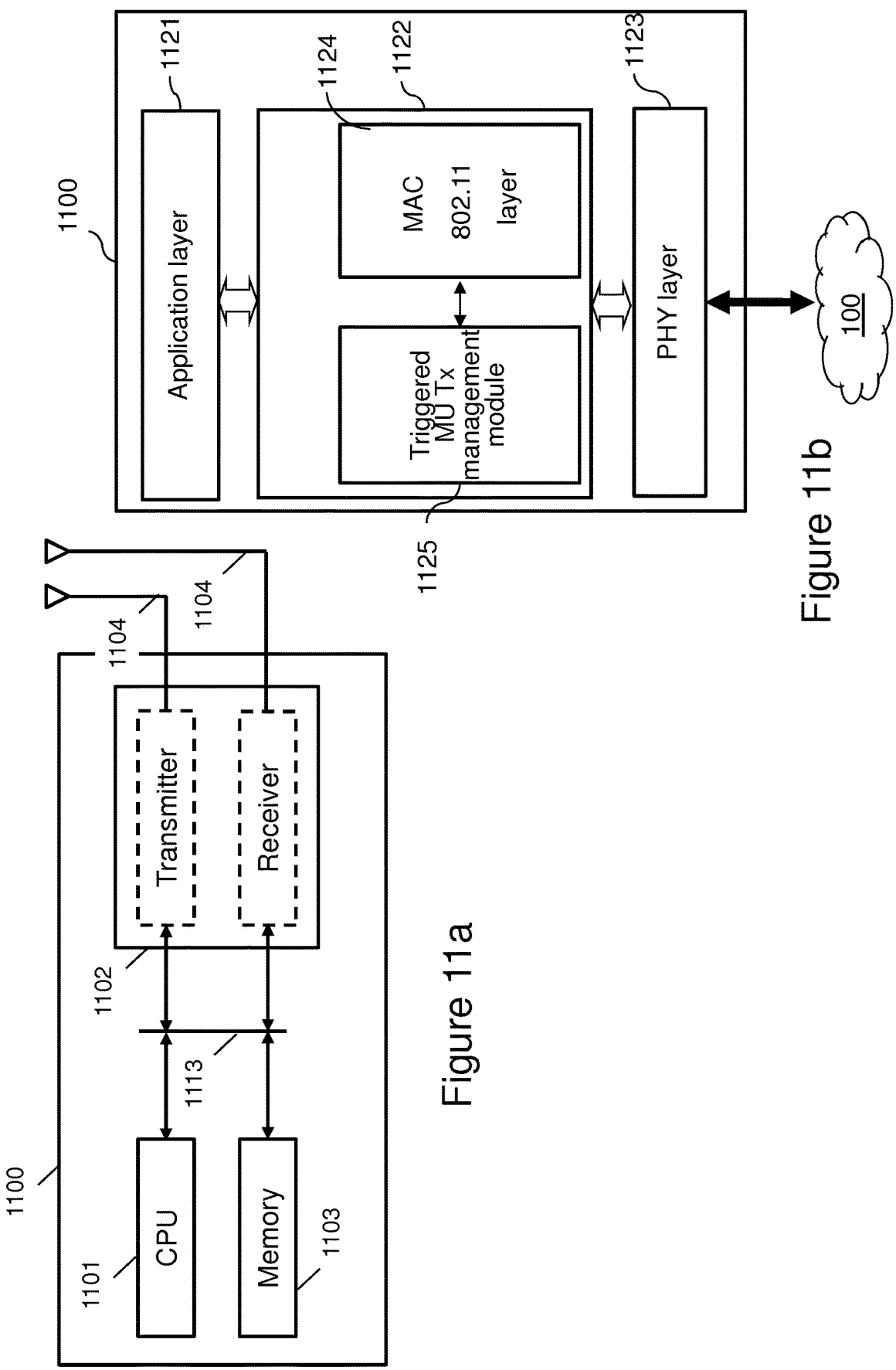

UNIQUE DIRECT LINK SESSION ID TO DRIVE STATIONS IN A WIRELESS NETWORK

CROSS-REFERENCE TO RELATED APPLICATIONS

The application is the National Phase application of PCT Application No. PCT/EP2019/068138, filed on Jul. 5, 2019 and titled "UNIQUE DIRECT LINK SESSION ID TO DRIVE STATIONS IN A WIRELESS NETWORK". This application claims the benefit under 35 U.S.C. § 119(a)-(d) of United Kingdom Patent Application No. 1811175.7, filed on Jul. 6, 2018 and titled "UNIQUE DIRECT LINK SESSION ID TO DRIVE STATIONS IN A WIRELESS NETWORK". The above cited patent applications are incorporated herein by reference in their entirety.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard.

Thanks to the MU feature, a station has the opportunity to gain access to the wireless medium via two access schemes: the MU scheme and the conventional Enhanced Distributed Channel Access—EDCA (Single User) scheme.

The 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using 16-bit Association IDentifiers (AIDs) assigned to them upon registration to the AP and/or using reserved AIDs designating a group of non-AP stations.

The adopted 802.11 MU transmission scheme is not adapted to bandwidth-demanding communication services, e.g. video-based services such as gaming, virtual reality, streaming applications. This is because all the communication go through the AP, thereby doubling the air time for transmission but also the number of medium accesses (and thus of medium access time).

The Single User (SU) scheme of 802.11ax allows a direct link (DiL) to be performed wherein the data (MAC) frames are addressed using the 48-bit IEEE MAC address of the destination station. However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

More generally, 802.11 ax is seen as not being adapted to direct link transmissions and MU transmissions can be improved.

In the same time, power management of the non-AP stations is implemented in 802.11 networks seeking to extend life time of the stations. The latter can enter a low-power mode, also known as doze mode, where the radio part is turned off. In low activity periods, the non-AP stations are in the doze mode but they still listen to the network to receive only elementary management frames such as beacon frames sent by an AP. The beacon frames are used by the AP to wake up the non-AP stations in doze mode. To that end, a beacon frame contains dedicated information indicating for each non-AP station whether the AP has buffered data for it, in which case the non-AP station has to wake up. The dedicated information is based on the above-mentioned 16-bit AID of the concerned non-AP station. The dedicated information can thus be seen as a wake-up flag.

This AID-based power management scheme reveals to be well adapted for transmissions from the AP. Indeed, the dedicated information mirrors data the AP has to send. However, it is not suitable as soon as the AP is no longer involved in the data transmission, such as a Direct Link transmission. It appears that the non-AP stations involved in a DiL session never enter the doze mode to save power, because none of them is able to know when the DiL transmissions will be initiated by a source station. Therefore, DiL sessions tend to degrade performance of 802.11 stations.

On overall, the AID-based signaling as currently proposed by 802.11ax is not adapted to Direct Link communications.

SUMMARY OF INVENTION

It is a broad objective of the present invention to improve this situation.

Certain aspects of the present disclosure provide a method for managing stations operating in Direct Link in a wireless network comprising, at a triggering station, usually an access point, AP:

obtaining a Direct Link, DiL, session identifier identifying a Direct Link transmission session established between (two or more) triggered (usually non-AP) stations (different from the triggering station), generating a control or management frame signaling control or management information to the triggered stations using the DiL session identifier, and sending the control or management frame to the triggered stations to trigger actions at these stations based on the control or management information.

Preferred implementation is when the triggering station is an AP and the triggered stations are non-AP stations (stations having registered to the AP).

From triggered (non-AP) station perspective, those aspects provide a method for managing stations operating in a Direct Link in a wireless network comprising, at a triggered station (usually a non-access-point, non-AP, station):

receiving, from a triggering station (usually an access point, AP), a control or management frame signaling control or management information to triggered stations using a Direct Link, DiL, session identifier identifying a Direct Link transmission session established between the triggered station and another (one or more) triggered station, and performing a control or management action based on the control or management information.

Thanks to the single DiL session identifier, the AP as a triggering station can drive simultaneously a plurality of non-AP stations for DiL-related actions, using the 802.11 context in which a single identifier can be signaled. DiL sessions in 802.11ax environments are thus better managed.

Aspects of the invention also provide a station in a wireless network comprising a microprocessor configured for carrying out the steps of the method defined above.

Optional features of these embodiments are defined in the appended claims with reference to methods. Of course, same features can be transposed into system features dedicated to any device according to the embodiments of the invention.

In embodiments, the control or management frame includes a trigger frame to trigger a multi-user, MU, transmission, wherein the trigger frame allocates, using the DiL session identifier, a resource unit of the MU transmission for Direct Link transmission between the triggered stations. In this approach, the control or management information informs of the RU allocated for DiL, while the action triggered by the AP through this information is the performance of the Direct Link transmission by the triggered stations over the allocated resource unit.

In other words, this corresponds to a method for wireless communication comprising, at a triggering station such as an access point, AP:

obtaining a Direct Link, DiL, session identifier identifying a Direct Link transmission session established between (a source and one or more destination) triggered stations such as non-AP stations, generating a trigger frame to trigger a multi-user, MU, transmission, wherein the trigger frame allocates, using the DiL session identifier, a resource unit of the MU transmission for Direct Link transmission between the triggered stations, and sending the trigger frame to the triggered stations to trigger the Direct Link transmission in the allocated resource unit.

From another perspective, this corresponds to a method for wireless communication comprising, at a triggered station such as an non-access-point, non-AP, station:

receiving a trigger frame to trigger a multi-user, MU, transmission, wherein the trigger frame allocates, using a Direct Link, DiL, session identifier identifying a Direct Link transmission session established with another triggered station, a resource unit of the MU transmission for Direct Link transmission with the other triggered station, and responsive to the trigger frame, sending directly to the other triggered station or receiving directly from the other triggered station a data frame over the resource unit allocated for the Direct Link transmission.

This approach integrates the direct link in the global policy of the AP's scheduling. This advantageously takes advantage of the high benefits of the transmission scheduling made by the AP in high density environments. Indeed, one or more RUs usually provided to MU UL transmissions (i.e. to the AP) are now dedicated to transmissions between non-AP stations where the AP no longer participate. EDCA competition between the AP willing to provide MU transmissions and the non-AP stations willing to perform DiL transmission is thus reduced. DiL transmissions are mixed up with UL transmissions within the same MU transmission thanks to the newly proposed AP scheduling. Hence, use of the wireless network is improved.

The non-AP stations involved in the DiL transmission may be a source station transmitting DiL data or a destination station receiving such DiL data.

In embodiments from the perspective of a triggered station willing to send DiL data, the method further comprises, at the triggered station, sending a data frame directly to the other triggered station using the resource unit allocated for the Direct Link transmission. A DiL transmission thus actually happens within a MU transmission triggered by the AP, contrary to prior techniques.

According to a specific feature, the method further comprises, at the triggered station prior to sending the data frame, determining that the DiL session identifier identifies a Direct Link transmission session from the triggered station to the other triggered station. The non-AP station thus operates as a DiL transmitter only if the DiL RU is allocated to do so through an appropriate DiL session ID.

In other embodiments from the perspective of a DiL destination triggered station, the method further comprises, at the triggered station, receiving a data frame directly from the other triggered station over the resource unit allocated for the Direct Link transmission. A DiL transmission thus actually happens within a MU transmission triggered by the AP, contrary to prior techniques.

According to a specific feature, the method further comprises, at the triggered station prior to receiving the data frame, determining that the DiL session identifier identifies a Direct Link transmission session from the other triggered station to the triggered station. The non-AP station thus operates as a DiL receiver only if the DiL RU is allocated to do so through an appropriate DiL session ID.

In some embodiments, the DiL session identifier is stored in an AID12 subfield of a User Info field associated with the resource unit in the trigger frame according to 802.11ax v3.0. This makes it possible to keep unmodified the 802.11ax format for the User Info field.

In other embodiments, the DiL session identifier is selected by an access point, AP, from AIDs not assigned to non-AP stations during association. This allows an efficient and dynamic management of the DiL session identifier. Indeed, the AP has an overall view of the wireless network, in particular of the AIDs already assigned. Furthermore, this approach avoids having a conflict between AIDs.

In specific embodiments, the DiL session identifier is selected from a range of AID values that is distinct from the range of AID values used by the AP to allocate AIDs to non-AP stations during association. For instance, the DiL session identifier is selected from range [2008, 2044] or from a subset thereof. In a variant, the DiL session identifier is selected from range [1, 2007] or from a subset thereof. This variant advantageously complies with the current 802.11 format of the Traffic Indication Map or Traffic Indication Virtual bitmap.

All these provisions also contribute to reduce conflicts between AIDs.

In other embodiments, the control or management frame includes a beacon frame in which the DiL session identifier is associated with a wake-up flag triggering a waking up of the triggered stations from a doze mode. A centralized management (by the AP) of power saving at DiL-involved stations is made possible without modifying the current 802.11 format of the beacon frames. Compared to known techniques, such DiL-involved stations can now enter a doze mode.

In other words, this corresponds to a method for power saving management of stations in a wireless network comprising, at a triggering station such as an access point, AP:

obtaining a Direct Link, DiL, session identifier identifying a Direct Link transmission session established between triggered stations such as non-AP stations, generating a beacon frame including a wake-up flag associated with the DiL session identifier, and sending the beacon frame to wake up the triggered stations from a doze mode.

From triggered station perspective, the received control or management frame includes a beacon frame in which the DiL session identifier is associated with a wake-up flag, and the method further comprises, at the triggered station, deciding to wake up from a doze mode depending on the wake-up flag.

It means that a method for power saving management of stations in a wireless network may comprise, at a triggered station such as a non-access-point, non-AP, station:

establishing a Direct Link, DiL, session with another triggered station, and entering a doze mode saving power, while the DiL session is active.

In some embodiments, the beacon frame comprises a traffic indication virtual bitmap associating AIDs, each identifying a corresponding non-AP station, with respective flags indicating whether the AP stores data intended for the corresponding non-AP station, and the flag associated with an AID equal to the DiL session identifier is enabled to trigger the waking up of the triggered stations involved in the DiL transmission session. The flag can thus be assimilated to a "wake-up" flag. This approach advantageously does not modify the 802.11ax signaling.

In some embodiments, the DiL session identifier is selected by an access point, AP, from AIDs not assigned to non-AP stations during association. This allows an efficient and dynamic management of the DiL session identifier. Indeed, the AP has an overall view of the wireless network, in particular of the AIDs already assigned. Furthermore, this approach avoids having a conflict between AIDs.

In specific embodiments, the DiL session identifier is selected from a range of AID values that is distinct from the range of AID values used by the AP to allocate AIDs to non-AP stations during association. For instance, the DiL session identifier is selected from range [1, 2007] or from a subset thereof. This approach advantageously complies with the current 802.11 format of the Traffic Indication Map or Traffic Indication Virtual bitmap.

In embodiments, the method at the triggered station may further comprise, sending, to the triggering station, a buffer status report (DiL-BSR) indicating data to be transmitted to the other triggered station. It means the method further comprises, at the triggering station, receiving, from any of the triggered stations, a buffer status report indicating data to be transmitted to the other triggered station. Indeed, the DiL transmission may be performed along either direction between the triggered stations. Thanks to the DiL-BSR, the triggering station (AP) becomes aware that a DiL session is active between the triggered (non-AP) stations and becomes aware when DiL data are ready to be sent. The triggering station can thus perform efficient scheduling. For instance, the method at the triggering station may further comprise scheduling a multi-user, MU, transmission with a resource unit allocated for Direct Link transmission based on the received buffer status reports.

Such DiL-BSR reporting DiL-related data may be sent spontaneously by the triggered stations.

However, in embodiments, sending the buffer status report is responsive to a prior request received from the triggering station. At the latter, the buffer status report is responsive to a prior request sent by the triggering station.

In specific embodiments, the prior request includes a polling trigger frame sent by the triggering station to the triggered stations to poll their buffer status, wherein the polling trigger frame includes an indication that the poll relates to buffer data intended to Direct Link, DiL, between triggered stations.

More generally, a method for managing stations operating in Direct Link in a wireless network may comprise, at a triggering station such as an access point, AP:

sending a polling trigger frame to triggered stations such as non-AP stations to poll their buffer status, wherein the polling trigger frame includes an indication that the poll relates to buffer data intended to Direct Link, DiL, between triggered stations, and in response, receiving a DiL buffer status report from one or more triggered stations.

From triggered station perspective, a method for managing stations operating in Direct Link in a wireless network comprising, at a triggered station such as a non-access-point station:

receiving a polling trigger frame from a triggering station such as an access point, AP, to poll its buffer status, wherein the polling trigger frame includes an indication that the poll relates to buffer data intended to Direct Link, DiL, with another triggered station, and responsive to the polling trigger frame, sending, to the triggering station, a DiL buffer status report indicating the data intended to another triggered station that are stored in local buffers.

Such a new request or new type of trigger frame makes it possible for the AP to have knowledge of non-AP station needs in terms of Direct Link transmissions. Better scheduling of DiL resource units in MU transmissions can be achieved.

In specific embodiments, a Trigger Type subfield value in a Common Info field of the polling trigger frame according to 802.11ax is one of values 8 to 15.

In a variant, a Trigger Type subfield value in a Common Info field of the polling trigger frame according to 802.11ax is 4, and a Trigger Dependent Common Info subfield of the Common Info field according to 802.11ax conveys the indication that the poll relates to DiL data. These variants advantageously comply with the current 802.11 signaling.

In embodiments, obtaining a DiL session identifier includes generating at least one DiL session identifier responsive to the receipt of the buffer status report. The AP can thus generate the DiL session ID on a need basis, when a new DiL session is discovered through the DiL-BSRs received. This helps having an efficient management of the DiL session identifiers.

In specific embodiments, obtaining a DiL session identifier includes generating two DiL session identifiers, a first identifier identifying a Direct Link transmission from a first one of the triggered stations to a second one of the triggered stations and a second identifier identifying a Direct Link transmission from the second triggered station to the first triggered station. Of course, a single DiL session ID can be generated, usually corresponding to the direction inferred from the DiL-BSR received (from the DiL-BSR sender to the other triggered station for a Direct Link between two triggered stations) or not specifying any particular DiL direction.

As the number of identifiers available to identify the DiL sessions can be limited (in particular to fit in 802.11ax signaling), an efficient management of the DiL session identifiers is sought.

In embodiments, the method at the triggering station further comprises, prior to sending the control or management frame, sending to the triggered stations a setup message providing the DiL session identifier identifying the Direct Link transmission session established between them. It means at the triggered station that the method further comprises, prior to receiving the control or management frame, receiving from the triggering station a setup message providing the DiL session identifier identifying the Direct Link transmission session established between them. This makes the triggered (non-AP) stations be aware of the DiL session identifier, so that further control or management frames sent by the AP be appropriately understood and processed by them.

In specific embodiments, the setup message includes two DiL session identifiers, a first identifier identifying a Direct Link transmission from a first one of the triggered stations to a second one of the triggered stations and a second identifier identifying a Direct Link transmission from the second triggered station to the first triggered station. This in particular helps defining which triggered station can actually transmit in a resource unit allocated for DiL.

Efficient management of the DiL session identifiers is obtained when they can be released. To that end, the method at the triggering station may further comprises sending to the triggered stations a teardown message informing the DiL session identifier no longer identifies the Direct Link transmission session established between them. The triggered station may thus receive from the triggering station a teardown message informing the DiL session identifier no longer identifies the Direct Link transmission session established between it and the other triggered station. The teardown message may thus also comprise the DiL session identifier(s) to release.

Various criteria may be used to generate such a teardown message releasing a DiL session ID. For instance, the sending of the teardown message may be responsive to detecting a DiL session identifier end-of-life event. As examples, the DiL session identifier end-of-life event includes one or more of:

expiry of a timer since last receipt from the triggered stations of a buffer status report indicating data to be transmitted between them;

generation of a new DiL session identifier for a new Direct Link transmission session while a maximum number of generated DiL session identifiers is reached (in which case a releasing policy may be implemented, such as releasing the oldest assigned ID, the ID the last DiL report received is the oldest one, the ID with the lowest priority, etc.).

Another aspect of the invention relates to a non-transitory computer-readable medium storing a program which, when executed by a microprocessor or computer system in a device, causes the device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1 illustrates a typical wireless communication system in which embodiments of the invention may be implemented;

FIGS. 2a and 2b illustrate a conventional trigger-based (TB) MU UL OFDMA transmission according to 802.11ax;

FIG. 7 illustrate exemplary steps performed at the triggering station, usually the AP, for various stages of the scenario of FIG. 5, according to embodiments;

FIG. 8 illustrate exemplary steps performed at a triggered station, usually a non-AP station, for various stages of the scenario of FIG. 5, according to embodiments;

FIG. 10 illustrates, using a flowchart, detailed operations by a non-triggering station to perform DiL communication in a triggered-based MU transmission, according to embodiments;

FIG. 11a shows a schematic representation a communication device in accordance with embodiments of the present invention; and FIG. 11b shows a schematic representation of a wireless communication device in accordance with embodiments of the present invention.

DETAILED DESCRIPTION OF EMBODIMENTS

Figure 3:
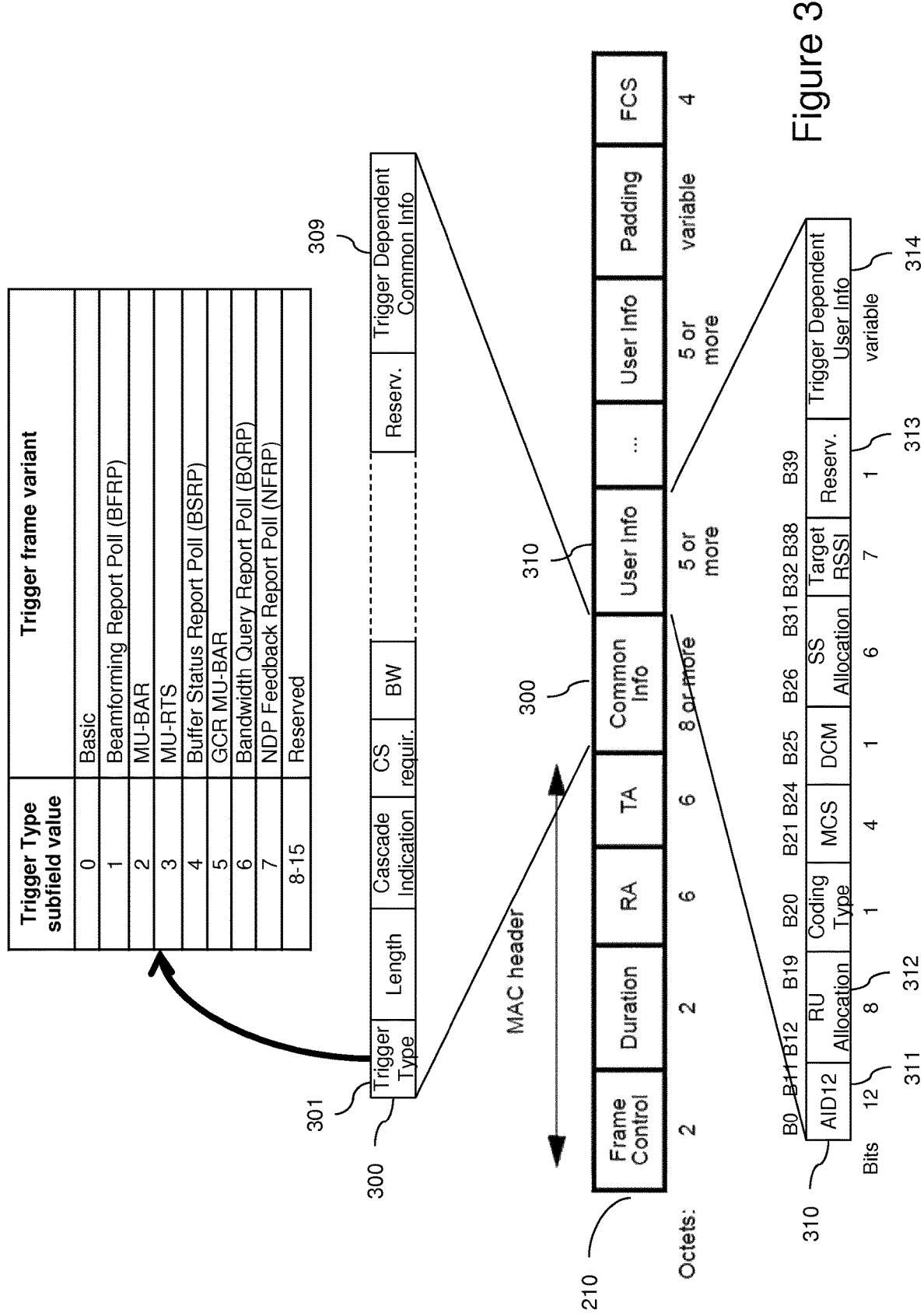
FIG. 3 illustrates the format of a trigger frame as described in section 9.3.1.23 of the 802.11ax standard to perform MU UL OFDMA transmissions.

Aspects of the present disclosure generally relate to Direct Link (DiL) sessions in wireless networks, and more particularly to an efficient signaling of pairs of DiL-involved stations to control the latter. The present disclosure finds application in enhanced multi-user (MU) uplink (UL) protocols in wireless networks that allow non-UL transmissions to be performed simultaneously with triggered MU UL transmissions, as well as in station power saving management. As will be described in more detail herein, a station may send a trigger frame triggering MU transmissions with an appropriate signaling to allow non-UL transmissions, in particular DiL transmission to another triggered station, in a DiL resource unit of the MU transmission.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station).

An AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a non-AP station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a wireless communication system in which several communication stations 101-107, 110 exchange data frames over a radio transmission channel 100 of a wireless local area network (WLAN), under the management of a central station, namely access point (AP) 110 with which the stations have registered. In a variant, direct communications between stations can be implemented without the use of an access point (known as an Ad-hoc mode). The radio transmission channel 100 is defined by an operating frequency band constituted by a single channel or a plurality of channels forming a composite channel.

An exemplary wireless network is the 802.11 network according to 802.11ax version 3.0 standard (published in June 2018).

Each non-AP station 101-107 registers to the AP 110 during an association procedure. During the well-known association procedure, the AP 110 assigns a specific Association IDentifier (AID) to the requesting non-AP station. An AID is a 16-bit value uniquely identifying the non-AP station. According to IEEE standard, the value of an AID is assigned in the range 1 to 2007 for Directional multi-gigabit non-AP station; the 5 MSBs of the AID are reserved.

To know information about the wireless network, the non-AP station can read beacon frames that are transmitted periodically (e.g. each 100 ms) by AP 110. Such frames serve to announce the presence of the wireless network and to synchronize the stations registered to the AP.

Figure 6:
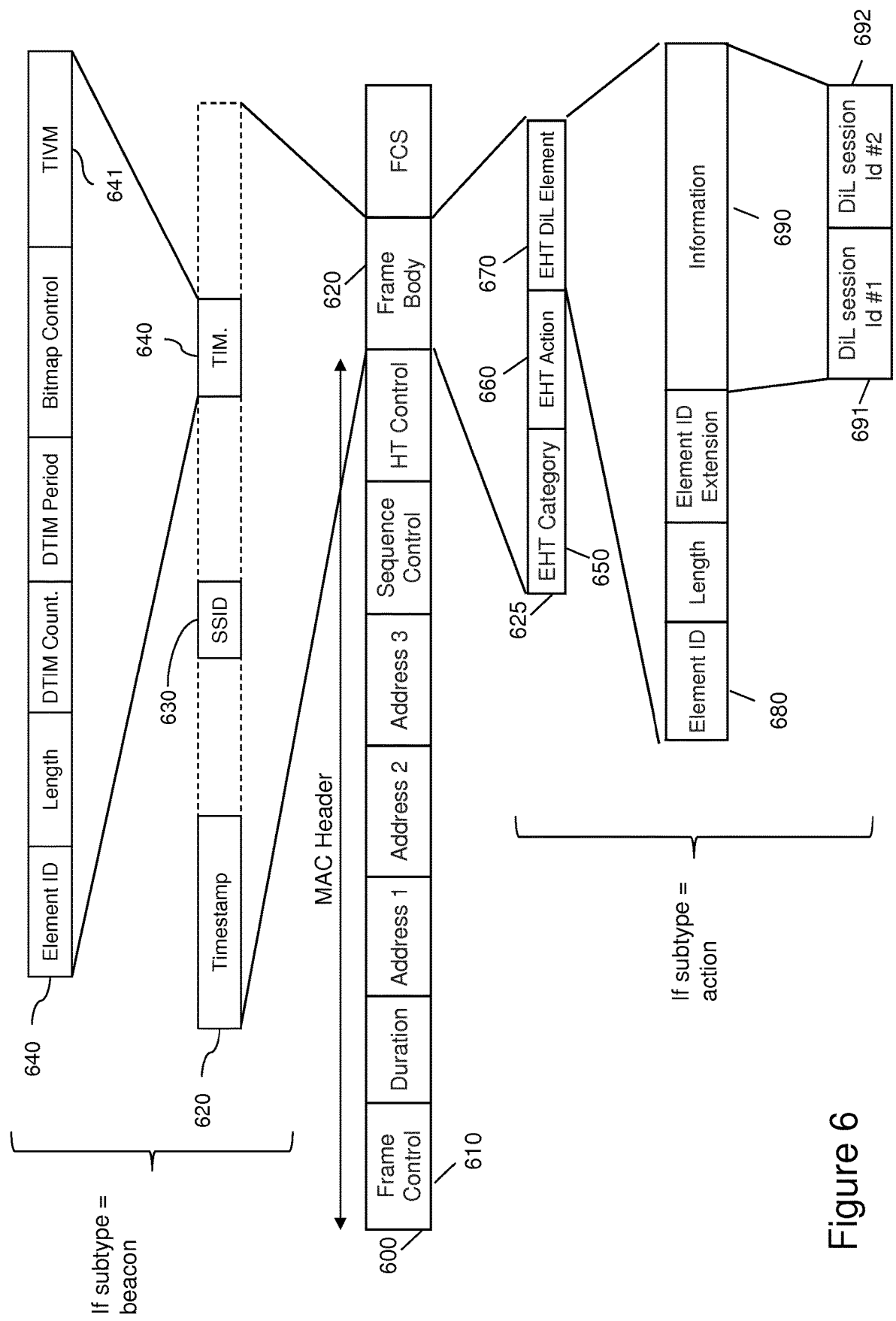
FIG. 6 illustrates a MAC Action frame, and more particularly an EHT action frame according to embodiments.

FIG. 6 illustrates the format of a beacon frame according to 802.11ax. 802.11 MAC frame 600 comprises a Frame Control field 610 and a Frame body 620. The other fields are of less importance here.

Frame Control field 610 is set to Type=management frame and subtype=beacon frame. Frame body 620 comprises various subfields (some of which are shown) according to 802.11ax, including a SSID subfield 430 uniquely identifying the wireless network and a Traffic indication map (TIM) element 440.

All the stations 101-107, 110 compete one against each other using EDCA (Enhanced Distributed Channel Access) contention, to access the wireless medium in order to be granted a transmission opportunity (TXOP) and then transmit data frames.

Some non-AP stations that have no data to send or to receive may enter a so-called doze mode where it is not able to receive and transmit data. The doze mode is available for power management.

In the doze mode, the non-AP stations are still able to listen to the most elementary management frames such as the beacon frames sent by AP 110. AP 110 uses the beacon frame to warn the non-AP stations some data intended to them are about to be sent by the AP. Indeed, when AP 110 receives data for a given non-AP station, AP 110 buffers the data and indicates in the next beacon frame 600 whether data frames are buffered for the given non-AP station. Consequently, the non-AP station exits from the doze mode in order to receive the data buffered by AP 110. This is a waking up mechanism for 802.11 stations.

The waking up mechanism relies on Traffic indication map (TIM) 640 provided by the beacon frame. TIM 640 includes a Traffic Indication Virtual Map (TIVM) 641 which is a bit mask and consists of 2008 bits, each bit representing the Association Id (AID) of a non-AP station.

Each bit in TIVM 641 indicates the presence of buffered data for a given non-AP station. More precisely, the kth bit of TIVM corresponds to the non-AP station for which its AID is equal to k. The kth bit it is set to 1 if the AP has buffered data to deliver to this specific non-AP station. Otherwise, it is set to zero.

In case few non-AP stations are present, a mechanism has been defined in 802.11 standard in order not to send the full TIVM 641 but only a shortened version in it.

The TIM-based waking up mechanism as defined in 802.11ax thus clearly authorizes waking up of non-AP stations for which AP 110 has data to transmit.

To increase wireless network efficiency, multi-user (MU) schemes are available to allow a single station, usually the AP 110, to schedule MU transmissions, i.e. multiple simultaneous transmissions to or from other stations, in the wireless network. Such a MU scheme has been adopted in 802.11ax, as the Multi-User Uplink and Downlink OFDMA (MU UL and DL OFDMA) procedures.

With reference to FIG. 2a, to actually perform such MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

To finely control the MU UL transmissions by the non-AP stations 101-107, the AP 110 sends a trigger frame 210 which defines how the channel is split into RUs and which non-AP station is allowed to transmit over each RU. In this example, trigger frame 210 assigns RU 201 to STA1, RU 202 to STA2, RU 203 to STA3 and RU 204 to STA4. The assignment is made using the AIDs of the non-AP stations.

Upon reception of trigger frame 210, each non-AP station determines its assigned RU thanks to its own AID and can start transmit MU frames 220 (known as HE TB PPDU) over its assigned RU to the AP after a SIFS period after trigger frame 210.

Due to the triggering mechanism, the terms "trigger-based MU UL transmission" are used.

FIG. 2b illustrates the same MU UL transmission from station perspective.

FIG. 3 illustrates the format of the trigger frame as described in section 9.3.1.23 of the 802.11 ax standard, draft version 3.0, to perform MU UL OFDMA transmissions.

The trigger frame 210 contains several fields as defined in the IEEE standard 802.11ax and in particular it includes a single Common Info field 300 and a plurality of User Info fields 310.

Each User Info field 310 defines the assignment of the RUs to respective non-AP stations 101-107, as well as communication parameters to respect for UL communication with the AP. To do so, RU Allocation subfield 312 identifies the RU concerned (central frequency and frequency bandwidth), while AID12 subfield 311 carries the 12 LSBs of the AID of the non-AP station for which the RU is assigned.

Bit B39 313 of User Info field 310 is currently not used. Trigger Dependent User info subfield 314 is mainly used to provide details on communication parameters defined by the other subfields of the User Info field 310. The content of Trigger Dependent User info subfield 314 depends on the type of trigger frame. The format shown in the Figure corresponds to Trigger Dependent User info subfield 314 of a basic trigger frame.

The User Info field as defined in 802.11ax thus clearly authorizes only UL transmissions as only the source non-AP station is identified in AID12 subfield 311.

Although non-AP stations have the ability to establish a direct link communication between them (by using the Tunneled Direct Link Setup specified in IEEE 802.11 standard) in order to communicate directly without exchanging with AP, it is contemplated allowing Direct Link (DiL) transmissions to be scheduled in a MU transmission. This aims at further increasing bandwidth and decreasing latency requirements that are demanded for wireless communications systems in high-density environments. An issue with this approach is that the AID-based signaling in the trigger frame 210 does not allow allocating an RU to two non-AP stations.

Also, the TIM-based waking up mechanism described above does not take into account the DiL data traffic. This is again because it is AID-based, meaning AP 110 only signals its own data intended to each non-AP station.

The AID-based signaling as currently proposed by 802.11 is thus not appropriate for Direct Link communications.

Aspects of the invention thus provide a control or management frame signaling control or management information to the triggered stations using a Direct Link, DiL, session identifier. The DiL session identifier identifies a Direct Link transmission session established between (two or more) triggered (usually non-AP) stations. The AP (more generally any triggering station managing the network through sending of trigger frames) can then send the control or management frame to the non-AP stations to trigger actions at these stations based on the control or management information.

Indeed, such a non-AP station, upon receiving the control or management frame with the DiL-session-identifier-based signaling, can perform a control or management action based on the control or management information.

Embodiments of the invention apply to the performance of Direct Link transmissions. The control or management frame includes a trigger frame to trigger a multi-user, MU, transmission. The trigger frame allocates, using the DiL session identifier, a resource unit of the MU transmission for Direct Link transmission between the triggered stations. It results that the triggered (non-AP) stations can then perform actual DiL transmission over the allocated DiL RU.

Other embodiments of the invention apply to the management of station power saving. In that case, the control or management frame may include a beacon frame in which the DiL session identifier is associated with a wake-up flag triggering a waking up of the triggered stations from a doze mode. The conventional TIM-based waking up mechanism is still operable, extended by specific AIDs used as DiL session identifiers. The triggered station may decide to wake up from a doze mode depending on the wake-up flag associated with an identifier of one of its DiL sessions.

Turning back to the allocation of DiL resource units in UL MU transmissions, the trigger frame sent by the triggering station (usually an AP) to other triggered stations (usually non-AP stations) is enhanced into a trigger frame allocating a resource unit of the MU transmission for direct link transmission between two or more triggered stations, usually non-AP stations.

A station receiving the trigger frame is referred to as triggered station, while the station sending the trigger frame is referred to as triggering station.

The newly proposed trigger frame offers Direct Link (DiL) transmission capabilities within the triggered MU transmission, in addition to Uplink (UL) transmission capabilities.

An uplink MU transmission is defined as a MU transmission from a non-AP station to the AP.

A Direct Link (DiL) MU transmission is defined as a MU transmission from one non-AP station to one or more other non-AP stations.

Although the triggering station may be any of stations 101-107, 110, the examples provided below mainly concentrate on the AP 110 as the triggering station and non-AP stations 101-107 as triggered stations. Of course other configuration may be implemented where the AP is a triggered station and one non-AP station is the triggering station.

As will be described in more detail herein, a triggered station may then send a data frame directly to a destination triggered station using the resource unit allocated, by the trigger frame, for direct link transmission to that destination triggered station. This implements the Direct Link (DiL) capability offered during the triggered MU transmission, from a DiL source triggered station perspective.

Also, another triggered station may then receive a data frame over the resource unit allocated for data transmission to the triggered station. This implements the Direct Link capability from DiL destination station perspective.

Below, DiL RU refers to a resource unit so allocated for Direct Link transmission.

Figure 4:
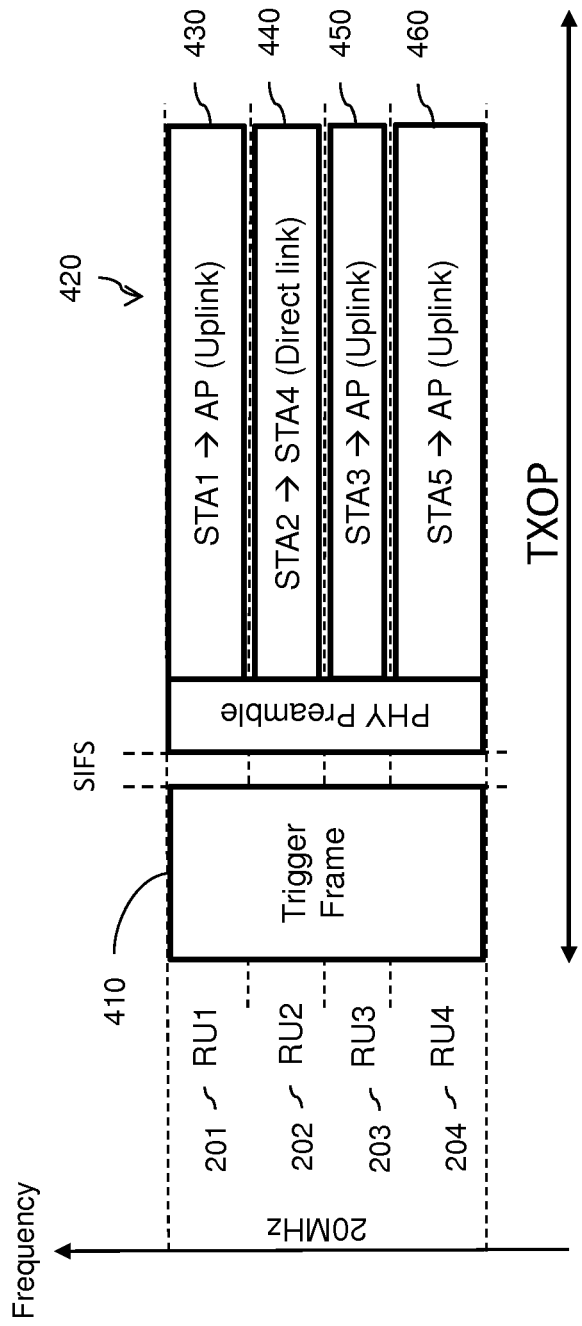
FIG. 4 illustrates a trigger-based (TB) Multi-User (MU) transmission that includes, in addition to conventional MU UL transmissions to the triggering station, MU transmissions directed to triggered stations.

FIG. 4 illustrates a trigger-based (TB) Multi-User (MU) transmission that includes, in addition to conventional MU UL transmissions to the triggering station (the AP), MU transmissions directed to triggered stations (one or more non-AP stations).

In this example, the MU transmission 420 triggered by trigger frame 410 contains conventional uplink MU frames 430, 450, 460 over RU 201 (from non-AP STA1 to AP 110), RU 203 (from non-AP STA3 to AP 110) and RU 204 (from non-AP STA5 to AP 110) and Direct Link (DiL) MU frames 440 over DiL RU 202 (from non-AP STA 2 to non-AP STA 4). More generally, the number of DiL RUs may vary.

Aspects of the invention provide that trigger frame 410 conveys the signaling of such DiL MU resource units. Then, upon reception of the trigger frame, the triggered stations (here non-AP stations) are able to determine whether they are allocated a resource unit for DiL transmission, and in the affirmative which resource unit either to transmit or to receive.

An exemplary signaling of DiL RUs is based on the conventional 802.11ax format of User Info field 310, which is only extended to support DiL MU transmissions by the use of DiL session identifiers. For instance, the DiL session identifier is stored in AID12 subfield 311 (see FIG. 3) of conventional 802.11ax User Info field associated with the resource unit in the trigger frame. It means that a single AID value simultaneously signals the DiL purpose and each of the stations involved in the DiL. As further described below, such DiL session identifier may be dynamically provided by the AP upon having knowledge of the DiL sessions or may be set in advance. Preferably, the DiL session identifier is selected by the AP from AIDs not assigned to non-AP stations during association, for instance from a range of AID values that is distinct from the range of AID values used by the AP to allocate AIDs to non-AP stations during association. As an example, the DiL session identifier may be selected from range [2008, 2044] or from a subset thereof. In a variant, available AID in the range [1, 2007] or in a subset thereof may be used, in particular if the power saving management as described below is implemented.

Figure 5:
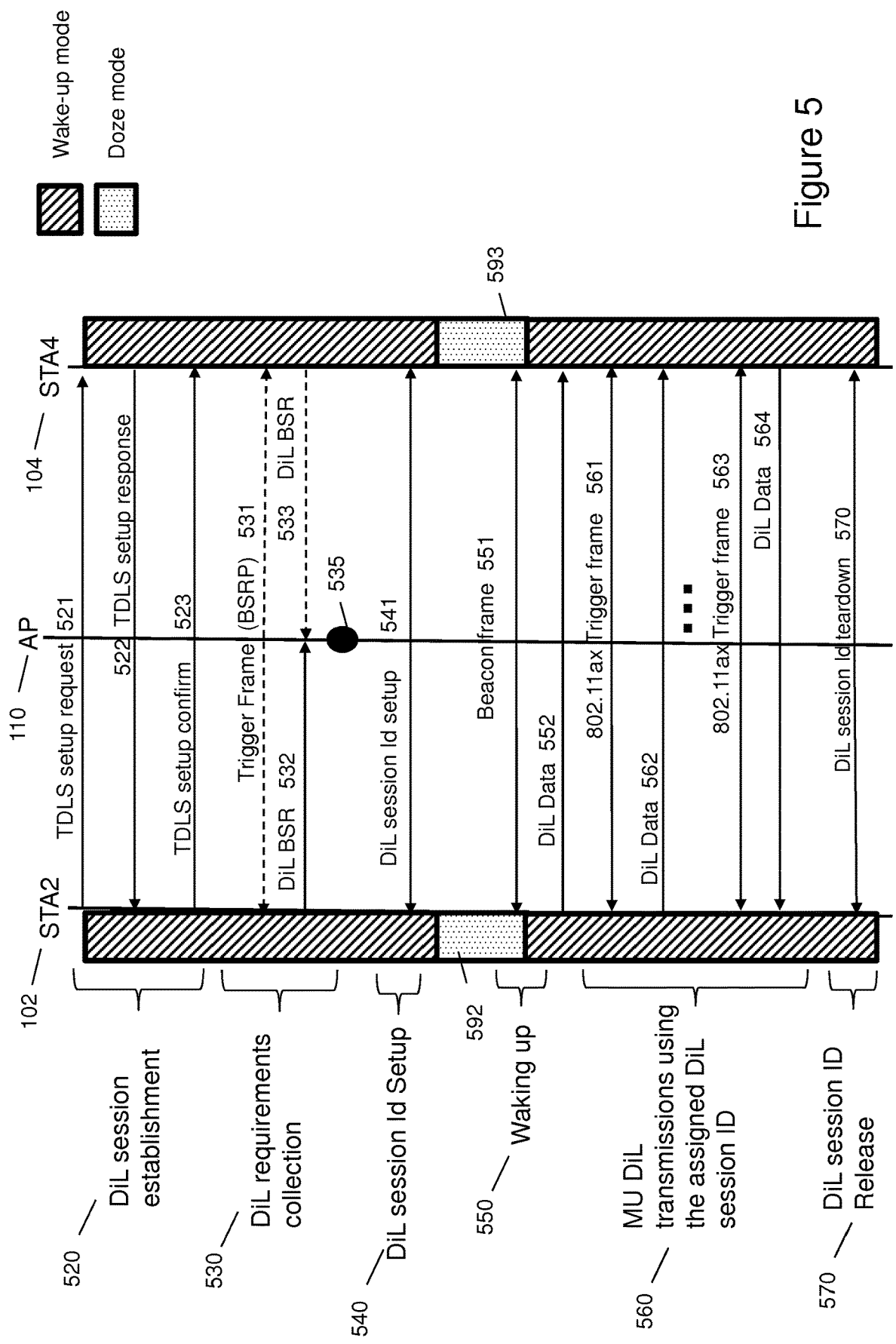
FIG. 5 illustrates an exemplary scenario using DiL session IDs according to embodiment of the invention.

FIG. 5 illustrates various message exchanges in a DiL-session-ID-based exemplary scenario including DiL communication in MU transmission according to embodiments of the invention.

The flowchart describes the exchange between the AP 110 and non-AP stations STA2 102 and STA4 104 (involved in a DiL session in FIG. 4). Non-AP station 102 and Non-AP station 104 are able to transfer data directly with each other without involving the AP. Such a mechanism is based on the 802.11z amendment of the 802.11 standard referred to as Tunneled Direct Link Setup (TDLS).

Basically, step 520 of DiL session establishment consists in establishing the DiL session based on TDLS mechanism. Non-AP station STA2 102 sends a TDLS setup request frame 521 to non-AP station STA4 104. If non-AP station STA4 104 agrees, it sends a TDLS setup response 522 indicating an acceptance of the TDLS procedure. Upon reception of a positive TDLS setup response (response containing an acceptance by the non-AP station STA4 104), non-AP station STA2 102 sends back a TDLS confirm frame 523 to non-AP station STA4 104. Then the tunneled direct link communication is established. The messages exchanged are used by the two non-AP stations to agree on transmission parameters to be used for the DiL transmission.

At this stage, a DiL session is established between non-AP station STA2 102 and non-AP station STA4 104. However, AP 110 is not yet aware of such DiL session (and thus of related DiL needs for the non-stations).

Thus step 530 of DiL requirements (needs) collection is executed, during which AP 110 retrieves the DiL requirements of at least one of the two non-AP stations involved in the DiL session.

For instance, in a first embodiment, the retrieval is initiated by AP 110. To do so, a request is sent by AP 110 to the non-AP stations at step 531. For illustration purposes, a specific type of trigger frame may be defined for such a request, corresponding to Buffer Status Report Poll for DiL transmission (DL-BSRP). More precisely, a trigger frame 210 is generated with a 802.11 Trigger Type subfield value 301 in a Common Info field 300 of the polling trigger frame according to 802.11 ax (see FIG. 3) is one of values 8 to 15, corresponding to Buffer Status Report Poll for DiL transmission (DL-BSRP). This new value shall thus be added to the table 302 of trigger types as currently defined by 802.11ax (see FIG. 3).

A variant may consist in having a Trigger Type subfield value 301 in a Common Info field 300 of the polling trigger frame according to 802.11ax equal to 4, and a Trigger Dependent Common Info subfield 309 of the Common Info field 300 according to 802.11ax conveys the indication that the polling trigger frame relates to DiL data.

Once receiving the DL-BSRP trigger frame, at least one non-AP station, preferably each one, that has some data frames to send to another non-AP station through direct link, sends a DiL Report (532, 533) including for instance the buffer status corresponding to the amount of data ("DiL data") held in an emission buffer ready to be transmitted directly to another non-AP station.

According to another embodiment, the non-AP station sends its DiL Report (532, 533) spontaneously, without being requested by AP 110.

According to yet another embodiment, the non-AP stations send periodically their DiL Reports or send them when an amount of DiL data in their local buffers exceeds a given threshold.

Next, step 535 of DiL session ID assignment is executed by AP 110 based on received DiL reports. AP 110 may have a local table storing all the DiL session ID currently active and the associated non-AP stations. Optionally the table may also store the amount of DiL data regarding the DiL session concerned.

Responsive to the receipt of a DiL report, AP 110 may check whether or not a DiL session ID has already been generated. In the affirmative, no new DiL session ID needs to be generated. However, the corresponding amount of DiL data may be updated. In the negative of the check, at least one DiL session identifier is generated.

According to a first embodiment of the invention, only one DiL session ID is assigned for the DiL session established between non-AP station STA2 102 and non-AP station STA4 104, referred to as DiL_SESSION_ID #1. This DiL session ID may be directional, meaning it indicates (for instance for DiL RU allocation) a specific direction of DiL transmission from the station providing the DiL report to the other non-AP station. Alternatively, the DiL session ID may be not directional, thereby indicating both DiL directions.

According to a second embodiment of the invention, two DiL session identifiers are generated, a first identifier (DiL_SESSION_ID #1) identifying a Direct Link transmission from a first one of the triggered stations (e.g. STA2) to a second one of the triggered stations (e.g. STA4) and a second identifier (DiL_SESSION_ID #2) identifying a reverse Direct Link transmission from the second triggered station to the first triggered station.

As mentioned above, the DiL session identifiers are selected from AIDs not yet assigned to non-AP stations during association and to other DiL sessions. They may be selected from range [2008, 2044] or from a subset thereof, for instance [2010, 2030] enabling 20 DiL session IDs corresponding to 10 or 20 DiL sessions to be managed simultaneously. Alternatively, in particular when the power saving management is implemented, they are selected from range [1, 2007] or from a subset thereof.

Next, step 540 of DiL session ID setup is performed during which AP 110 generates a "DiL session Id setup" frame to inform the non-AP stations of their DiL session IDs. The AP thus sends to the non-AP stations a setup message providing the DiL session identifier(s) identifying the Direct Link transmission session established between them.

To do so, an 802.11 MAC frame 600 with a Frame Control field 610 set to subtype=Action is used as illustrated in FIG. 6. Such an 802.11 MAC Action frame is a management frame used to trigger an action. In particular, it contains an "Action" field 625 (defined in section 9.4.1.11 of the 802.11 standard) within its "Frame Body" field 620. The "Action" field 625 contains an "EHT Category" field 650, an "EHT Action" field 660 and an "EHT DiL Element" 670.

The EHT Category" field 650 describes the action frame type. Several action frame types are defined (IEEE 802.11-Table 9-47—Category values), each one corresponding to a category value (also referred to as code). Embodiments of the invention define a new code, referred to as EHT CODE, compared to 802.11 standard, which takes a predefined value between 32 and 125. An action frame for which its "EHT Category" field 650 is set to EHT_CODE is referred to as EHT action frame.

The "EHT Action" field 660, in the octet immediately after the "EHT Category" field 650, differentiates the EHT Action frame formats. Two "EHT Action" field values associated with each frame format within the HE category may be defined: a "EHT Action" field value 660 equal to a first value (for instance 0) indicates a "DiL session Id setup" frame, while a "EHT Action" field value 660 equal to a second value (for instance 1) indicates a "DiL session Id teardown" frame.

The "EHT DiL Element" field 670 may correspond to an 802.11 Element (IEEE 802.11-9.4.2) dedicated to EHT DiL transmissions. Several 802.11 Elements have been already defined (IEEE 802.11-Table 9-77—Element UDs), each one corresponding to an Element ID value 680. According to embodiments of the invention, a new Element ID value, referred to as EHT DIL ELEMENT ID, is chosen not yet defined in the 802.11 standard. This is to define EHT DiL Elements for the purpose of DiL session ID management: an EHT DiL Element has its "Element ID" field set to EHT_DIL_ELEMENT_ID.

The EHT DiL Element field 670 also contains an "Information" subfield 690 to convey the DiL session ID or IDs generated by AP 110. According to a first embodiment of the invention, the "Information" field 690 contains one field 'DiL session Id #1' 691 coded on 12 bits. According to a second embodiment of the invention, the "Information" field 690 contains two fields "DiL session Id #1" 691 and "DiL session Id #1" 692, each one coded on 12 bits.

Back to FIG. 5, the "DiL session Id setup" frame is thus generated by using such an EHT action frame with the "EHT Action" field value 660 set to 0 and the "Information" subfield 690 storing the DiL session ID or IDs generated at step 535: field 691 contains DiL_SESSION_ID #1 and field 692 contains DiL_SESSION_ID #2 if any.

In case both DiL session IDs are specified in "Information" subfield 690, the first one stored in field 691 may be the one corresponding to a DiL direction from the TDLS initiator (i.e. the station having sent the TDLS setup request 521), meaning the TDLS initiator is the source station for the DiL transmission. This convention makes it possible for the non-AP stations to know which DiL session ID corresponds to which DiL session direction for DiL transmission.

Alternatively, an AID of the source station and possibly of the destination station may be explicitly specified in the "Information" subfield 690. For instance, in the first embodiments of the invention including only DiL_SESSION_ID #1, two additional fields may be added: one (DiL_AID_FROM) specifying the source non-AP station for DiL transmission and one (DiL_AID_TO) specifying the destination non-AP station for DiL transmission. In the second embodiments of the invention including DiL_SESSION_ID #1 and DiL_SESSION_ID #2, four additional fields may be added with the same scheme: DiL_AID_FROM #1 (resp. DiL_AID_FROM #2) for the source station and DiL_AID_TO #1 (resp. DiL_AID_TO #2) for the destination station.

The "DiL session Id setup" frame is then sent by AP 110 to the non-AP stations, here STA2 and STA4 (for instance by using their AID or MAC addresses). This is step 541.

At this stage, the non-AP stations, here STA2 and STA4, become aware of the DiL session ID or IDs in which they are involved.

Actions may then take place at the non-AP stations, which actions are triggered by control or management frames using the DiL session IDs as long as these IDs are active. This is steps 550 and 560.

Step 550 regards the waking up of the non-AP stations from the doze mode, if necessary, by TIM-based waking up mechanism already introduced above. Step 560 regards the performance of DiL communication in an MU transmission. A plurality of occurrences of the steps 550 and 560 may take place, in any order. Other types of actions (not shown) may also take place, for instance a DiL communication between STA2 and STA4 using the 802.11 SU scheme.

Step 550 of station waking up takes place when STA2 and STA4 are in doze mode (state 592 and 593 in the Figure). In this mode, the two non-AP stations listen to only beacon frames sent by AP 110.

After a while, AP 110 sends a beacon frame 551 containing a TIM Information Element 910 for which the Kth bit (wake-up flag) of TIVM 640 is set to 1 with K corresponding to DiL_SESSION_ID #1 (first or second embodiment of the invention) or/and DiL_SESSION_ID #2 (second embodiment of the invention).

Upon receiving such a beacon frame 551, STA2 102 and STA4 104 read TIM Information Element 640 of the beacon frames. As the Kth bit of the TIVM 640 of the TIM information Element 640 is set to 1 and K is the DiL session ID corresponding to a DiL session for which the two stations are involved, they wake up. Thus, these non-AP stations may decide to wake up from a doze mode depending on the wake-up flag (here the Kth bit).

As the two stations are now waked up, they can perform a DiL communication, for instance from STA2 to STA4 using 802.11SU scheme (step 552).

Also AP 110 may decide to wake up these two stations because it intends to provide them with a DiL RU in the next MU transmission. Of course a DiL RU may also be provided at any time when the two non-AP stations are awake. For instance, AP 110 may decide providing DiL RUs based on the DiL needs collected at step 530.

This is step 560 of MU DiL transmissions.

In particular, AP 110 sends a basic trigger frame 561 (corresponding to a frame 210 with a "Trigger Type" subfield 301 set to 0, described with reference to FIG. 3). The trigger frame 561 contains a "User Info" field 310 associated with a RU to allocated to DiL transmission, which User Info" field 310 has its "AID12" subfield 311 set to a DiL session ID, for instance DiL_SESSION_ID #1.

At the reception of the trigger frame 551, the "User Info" field 310 containing the DiL session ID in trigger frame 561 is extracted and processed by STA2 and STA4. For instance, if the DiL session ID is DiL_SESSION_ID #1, STA2 is ready to send (562) DiL data over the allocated DiL RU to STA4, and STA4 is ready to receive these DiL data from STA2 over the DiL RU.

AP 110 may send a second basic trigger frame 563 containing a "User Info" field 310 for a DiL RU, with its "AID12" subfield 311 set to DiL_SESSION_ID #2. This is to provide a DiL transmission from STA4 to STA2. Upon receiving trigger frame 563, STA2 and STA4 identify DiL_SESSION_ID #2: STA4 is ready to send DiL data (564) to STA2 over the allocated RU and STA2 is ready to receive these DiL data from STA4 over the RU.

Next, depending on various criteria, AP 110 may wish to release the DiL session IDs assigned to STA2 and STA4 for their DiL. This is step 570.

To do so, AP 110 builds a "DiL session Id teardown" frame, which is an EHT action frame with the "EHT Action" field value 660 set to 1 and the "Information" subfield 690 storing the DiL session ID or IDs generated at step 535: field 691 contains DiL_SESSION_ID #1 and field 692 contains DiL_SESSION_ID #2 if any (similar to the "DiL session Id setup" frame described above). AP 110 may thus send to the triggered stations (STA2 and STA4) a teardown message informing the DiL session identifier no longer identifies the Direct Link transmission session established between them. The stations (STA2 and STA4) thus receive from the AP the teardown message. Although the DiL session ID is no longer active, the DiL session established using the TDLS mechanism still exists. STA2 and STA4 can continue exchanging DiL data using the 802.11 SU scheme (the AP will no longer provide DiL RUs).

An AP may implement several mechanisms to manage the lifetime of a DiL session ID.

First embodiments rely on the time spent since the last DiL report received for the DiL session ID concerned. It means the "DiL session Id teardown" frame to release a DiL session ID will be sent by AP 110 upon detecting expiry of a timer since last receipt from the STA2 or STA4 of a DiL report indicating data to be transmitted between them.

For instance, a timer (EHT DiL timer) dedicated to a given DiL session ID (or a pair of DiL session IDs) is launched with an initial value when AP 110 assigns the DiL session identifier (or the pair) to a given DiL session (during step 535). Next, at each reception of a DiL report 532/533, AP 110 reinitializes the EHT DiL timer at its initial value.

When the EHT DiL timer expires (no DiL report has been received during a given period), AP 110 releases the DiL session ID(s) for the associated DiL session.

Second embodiments rely on the number of DiL session IDs currently active (because their number may be limited). AP 110 may send the "DiL session Id teardown" frame to release a DiL session ID upon detecting generation of a new DiL session identifier for a new Direct Link transmission session while a maximum number of generated DiL session identifiers is reached.

For instance, AP 110 launches a new timer (EHT DiL timer) for each a DiL session ID newly generated, up to a fixed number N of DiL sessions. When then number N is reached (N EHT DiL timers launched), a queue policy is applied for instance based on FIFO: for instance, the oldest launched EHT DiL Timer is selected (or the one expiring first) and the corresponding DiL session ID(s) is released for the associated DiL session.

Third embodiments are similar to the second embodiments where, instead of releasing the DiL session IDs corresponding to the oldest launched timers, the less prioritized timers are first released. A priority may be assigned to each timer (thus to each DiL session) and updated over time based on the DiL reports received. Information such as the buffer size, the data traffic type, the mean data rate of the DiL data declared in the DiL reports can be used to establish the priority value.

Turning now to the operations made by the triggering station and triggered stations, usually the AP and the non-AP stations respectively, FIG. 7 illustrate, using flowcharts, general steps performed by the triggering (here AP) station for the steps of FIG. 5, while FIG. 8 illustrate, using flowcharts, general steps performed by the triggered (here non-AP) stations for the same steps of FIG. 5.

Following the timing of FIG. 5, first the DiL session establishment step 520 is conventional. Next, the DiL requirements collection step 530 is illustrated by FIGS. 7a and 8a.

Step 700 of FIG. 7a from the AP perspective shows that the collection of DiL needs for stations operating in Direct Link in a wireless network comprises, at the AP:

sending (701) a polling trigger frame 531, such as the DL-BSRP trigger frame described above, to triggered non-AP stations to poll their buffer status, wherein the polling trigger frame includes an indication that the poll relates to buffer data intended to Direct Link, DiL, between non-AP stations, and in response, receiving (702) a DiL buffer status report 532,533 from one or more non-AP stations.

FIG. 8a shows that, at the non-AP stations, the DiL requirements collection step comprises:

receiving (800) a polling trigger frame 531 (DL-BSRP frame) from the AP, to poll its buffer status, wherein the polling trigger frame includes an indication that the poll relates to buffer data intended to Direct Link, DiL, with another non-AP station, and responsive to the polling trigger frame, sending (801), to the AP, a DiL buffer status report 532, 533 indicating the data intended to another non-AP station that are stored in local buffers.

As mentioned above, the DiL requirements collection step 530 may be triggered by AP 110 (through DL-BSRP frame) or be a spontaneous action performed by the non-AP stations (for instance as soon as they have new DiL data to declare) in which case steps 701 and 800 are not performed.

The DiL reports may include details about the DiL data, for instance traffic type, bitrate, data amount, etc. so that AP 110 can efficiently policies to manage the lifetime of a DiL session ID.

After DiL needs collection 530, DiL session assignment step 535 performed by AP 110 is illustrated in FIG. 7a.

At step 802, AP 110 upon receiving a new DiL report 532, 533 checks (703) whether new DiL session IDs shall be generated or not. For instance, it checks whether the buffer status indicated in the DiL report involves DiL sessions for which DiL session identifier(s) have not yet been assigned.

In the negative, no new DiL session ID needs to be generated and AP 110 may updates (704) the Buffer status of DiL sessions already assigned. For instance, the amount of DiL data may be updated. Such information is used by AP 110 to schedule DiL RU for specific DiL sessions and/or to manage the lifetime of the DiL session IDs.

In the affirmative, one or two DiL session IDs are assigned (705) for the DiL session indicated in the received DiL report. Details of the assignment have been given above with respect to step 535 (FIG. 5). The DiL session ID(s) generated and assigned at step 705 are stored by AP 110 (706).

Next to DiL session assignment step 535, DiL session Id setup step 540 is illustrated in FIGS. 7a and 8b.

To inform the non-AP stations of the DiL session IDs newly created, AP 110 generates (707) a "DiL session Id setup" frame already described above, which includes the DiL session ID or IDs so generated. AP 110 then sends the "DiL session Id setup" frame to the non-AP stations (708).

At the non-AP stations, the "DiL session Id setup" frame corresponding to their DiL sessions is received at step 810.

The receiving station then extracts (811) the new DiL session ID(s) contained in the received "DiL session Id setup" frame. More precisely, the fields 691 and 692 (if any) of the "Information" subfield 690 (see FIG. 6) are retrieved. The station then stores (812) the DiL session ID(s) in order to be able to detect any future control or management frame (e.g. trigger or beacon frame) using this DiL session ID to trigger action in the station.

At this stage, AP 110 is aware of all DiL session IDs while the non-AP stations are aware of their own DiL session IDs (i.e. those IDs corresponding to DiL sessions involving the station concerned itself).

In normal operation, a possible action is a waking up 550 of non-AP stations in doze mode. This is illustrated in FIGS. 7b and 8c.

At AP 110, a waking-up event (710) may decide when it is time to wake up the non-AP stations of a specific DiL session. For instance, AP 110 may detect that the amount of DiL data for the specific DiL session is now the most important amount of DiL data, in such a way it is time to wake up them in order to offer a transmission opportunity to transmit DiL data between them. Of course, other events may be used.

AP 110 thus updates (711) the TIM Information Element 640, in particular TIVM bitmap 641, for the next beacon frame to be transmitted. In practice, AP 110 retrieves one DiL session ID (SELECTED_DiL_SESSION_ID) corresponding to the specific DiL session concerned, and then sets to 1 the SELECTED_DiL_SESSION_ID$^{th}$ bit of the TIVM bitmap 641.

Next, AP 110 transmits the beacon frame (712).

In this process, the method for power saving management of stations in a wireless network comprising, at the AP:

obtaining a Direct Link, DiL, session identifier identifying a Direct Link transmission session established between non-AP stations, generating (711) a beacon frame including a wake-up flag (the SELECTED_DiL_SESSION_ID$^{th}$ bit) associated with the DiL session identifier, and sending (712) the beacon frame to wake up the non-AP stations from a doze mode.

In the example described above, the beacon frame comprises a traffic indication virtual bitmap (TIVM) associating AIDs, each identifying a corresponding non-AP station, with respective flags indicating whether the AP stores data intended for the corresponding non-AP station, and the flag associated with an AID equal to the DiL session identifier is enabled to trigger the waking up of the non-AP stations involved in the DiL transmission session.

At the non-AP stations, the beacon frame is received at step 820, in which the DiL session identifier is associated with a wake-up flag.

The non-AP station extracts (821) the Traffic Indication Virtual Map 641 of the TIM information Element 640 of the received beacon frame. It then checks (822) whether one bit amongst the DiL session IDs stored its local memory is set to 1.

In the affirmative, the non-AP station wakes up (entering in awake mode) meaning its radio part is active (for transmission or reception). It is step 823.

In the negative, the algorithm ends (824).

This waking-up process makes it possible for the non-AP stations to enter a doze mode although there are involved in a DiL session. It results that a method for power saving management of stations in a wireless network may comprise, at a non-AP station:

establishing a Direct Link, DiL, session with another triggered station, and entering a doze mode saving power, while the DiL session is active.

In normal operation, another possible action is a DiL transmission 560 during a trigger-based MU transmission. This is illustrated in FIGS. 7c and 8d.

AP 110 may decide at any time and according to any criterion that it is time to provide a DiL RU for a specific DiL session. This is event 720.

Decision to include such DiL or DL resource unit in the next MU transmission may be based on various criteria at the AP. For instance, the AP may have received Direct Link needs from non-AP stations and, responsive to the reception, decide to allocate a RU to DiL for these stations. In a variant, a DiL RU may be allocated periodically.

At step 721, the AP generates a trigger frame 410 to trigger a multi-user, MU, transmission. As introduced above, the trigger frame 410 allocates a resource unit of the MU transmission for DiL transmission between two non-AP stations, using an appropriate DiL session ID in AID12 subfield 311.

For efficiency purposes, scheduled RUs (i.e. those for which the source station is known) for UL or DiL are preferably declared in the trigger frame before random RUs (source station not known—the stations access to such RUs through contention) for UL transmission. This allows a non-AP station to know if it has a RU allocated for it before attempting to contend for access to a random RU.

Note the order of RU declaration is the order of corresponding User Info fields 310 in the trigger frame.

At step 722, the trigger frame 410 is sent by the AP to the non-AP stations.

Figure 9:
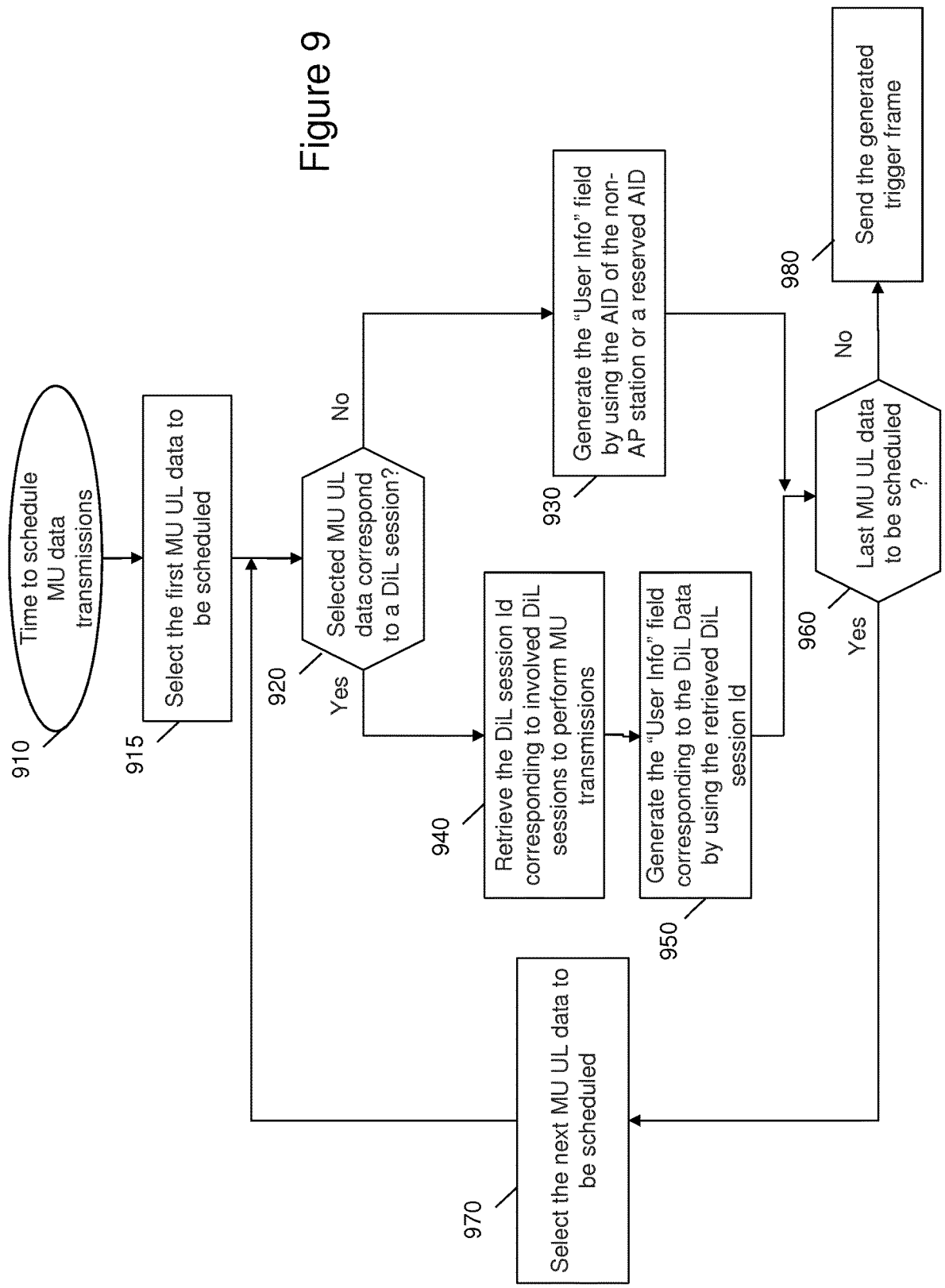
FIG. 9 illustrates, using a flowchart, detailed operations by the triggering station to trigger DiL RUs in a MU transmission, according to embodiments.

FIG. 9 provides more details of such a method for wireless communication which comprises, at a triggering station such as an access point, AP:

obtaining a Direct Link, DiL, session identifier identifying a Direct Link transmission session established between (a source and one or more destination) triggered stations such as non-AP stations, generating a trigger frame to trigger a multi-user, MU, transmission, wherein the trigger frame allocates, using the DiL session identifier, a resource unit of the MU transmission for Direct Link transmission between the triggered stations, and sending the trigger frame to the triggered stations to trigger the Direct Link transmission in the allocated resource unit.

Step 910 corresponds to the time selected by AP to schedule MU data transmissions. The time selected by AP is out of scope of the invention. At this time, AP selects a plurality of MU UL data to be scheduled. The selection of MU UL data to be scheduled is also out of scope of the invention.

Next step 915 selects the first MU UL data to be scheduled and step 920 checks whether the selected MU UL data correspond to a DiL session.

In the affirmative, the DiL session is referred to as SCHEDULED_DiL_SESSION and next step is step 940 where the AP retrieves the DiL session ID corresponding to SCHEDULED_DiL_SESSION. This ID is referred to as SCHEDULED_DiL_SESSION_ID.

The next step is step 950 where AP 110 generates the "User Info" field 310 corresponding to the SCHEDULED_DiL_SESSION by using the retrieved DiL session ID. More precisely, the "AID12" subfield 311 of the "User Info" field 310 is set to SCHEDULED_DiL_SESSION_ID. Next step is step 960.

In the negative of text 920, next step is step 930 where AP 110 generates a "User Info" field 310 in a conventional 802.11 way, i.e. by setting the "AID12" subfield 311 to the AID of the non-AP station to which the RU has to be allocated or to a specific AID value as explained above. Next step is step 960.

At step 960, AP 110 checks whether all MU UL data to be scheduled have been processed. In the negative, AP 110 selects the next MU UL data to be scheduled by AP at step 970, before looping back to step 920.

In the affirmative, next step is step 980 wherein AP 110 generates the trigger frame by concatenating all "User Info" fields generated at steps 930 and 950, and then sends the trigger frame to the non-AP stations.

The DiL communication 560 at a non-AP station during a trigger-based MU transmission is shown in FIG. 8*d*.

At step 830, the non-AP station receives, from a triggering station, usually AP 110, trigger frame 410 triggering a multi-user, MU, transmission, wherein the trigger frame allocates a resource unit of the MU transmission for DiL transmission to triggered (non-AP) stations, using a DiL session ID.

The non-AP station thus determines (831) whether it is involved in one of the RUs provided by trigger frame 410.

Allocation of a Scheduled RU according to 802.11ax is not described here. However, it is handled in a conventional way.

The determination of involvement of the non-AP station to one DiL RU may include detecting one of its DiL session IDs in the AID12 subfield 311 of the User Info fields 310 of the RUs.

If the affirmative of the determination, the DiL session ID helps the non-AP station knowing whether it has to transmit DiL data or receive DiL data at step 832 over the corresponding DiL RU.

In case the non-AP station is the destination station of the DiL session, it receives one or more data frames over the determined DiL resource unit allocated for DiL transmission between the non-AP stations.

In case the non-AP station is the source station of the DiL session, it sends a data frame directly to the destination non-AP station (according to the DiL session) using the resource unit allocated for direct link transmission.

As the same non-AP station can be a source triggered station and a destination triggered station for DiL transmission, its role is usually defined by the signaling provided in the trigger frame. FIG. 10 illustrates, using a flowchart, operations by such a non-AP station upon receiving a trigger frame containing a DiL User Info field with its AID12 subfield 311 set to one DiL session ID of the non-AP station.

Upon receiving a new trigger frame at step 1000, the non-AP station analyses each User Info field 310 one after the other to determine whether an RU is provided (step 1010) and, if any, whether there is a DiL RU (step 1020). It may merely consist in detecting a DiL session ID of the non-AP station in one AID12 subfield 311.

In the negative, the process ends (833).

In the affirmative, the non-AP station determines whether it is identified as a source station (test 1030—for instance taking into account the direction defined by the DiL session ID).

When the non-AP station is identified as a source station for the DiL transmission, the station transmits data frames within the identified DiL resource unit (step 1031). Otherwise if the non-AP station is identified as a destination station for the DiL transmission, the station waits and receives data frames over the identified DiL resource unit (step 1032).

After Waking-up processes 550 and/or DiL transmissions 560 have taken place, AP 110 may decide releasing a DiL session ID 570. This is illustrated in FIGS. 7*d* and 8*e*.

Indeed, a DiL session ID assigned to a given DiL session may have a lifetime, it means that it is valid only on a given period. This is to provide efficient management of the IDs. After this given period, the DiL session ID(s) may thus be released in order to be available for future assignment to another direct link session.

At step 730, a "Time to release DiL session IDs" event occurs at AP 110.

It may be an internal event such as the expiry of a timer (described above) or be responsive to an external event.

An external event may be the reception of a new DiL report 532, 533 requiring a new DiL session ID to be assigned, in replacement of another one.

Also, the release of DiL session IDs may be triggered by a triggered station (e.g. a non-AP station), rather than by the AP. For instance, a non-AP station may teardown a DiL session by sending a TDLS teardown request frame and receiving a TDLS teardown response frame by the other non-AP station involved in the DiL session. This message exchange scheme is conventional. After receiving the TDLS teardown response frame, the DiL session is no longer active and consequently the non-AP station may launch a frame (external event) to AP 110 indicating that DiL session ID(s) may be released.

The DiL session ID to release is referred to as DiL_SESSION_ID_TO_RELEASE.

Step 731 consists for AP 110 to release DiL_SESSION_ID_TO_RELEASE. It means that DiL_SESSION_ID_TO_RELEASE will no longer be used by AP 110, in particular for in MU UL transmissions for scheduling data for the corresponding DiL sessions. This ID is however available for re-assignment to another DiL session.

To inform the non-AP stations of the release of the DiL session ID, AP 110 generates (732) a "DiL session Id teardown" frame already described above, which includes the DiL_SESSION_ID_TO_RELEASE so released. AP 110 then sends the "DiL session Id teardown" frame to the non-AP stations (732).

At non-AP stations, the "DiL session Id teardown" frame is received at step 840.

The non-AP station then extracts (841) the DiL session ID(s) contained in the received "DiL session Id teardown" frame. More precisely, the fields 691 and 692 (if any) of the "Information" subfield 690 (see FIG. 6) are retrieved.

The station then deletes (842) the DiL session ID(s) from its local memory, in order for it to not act when a future control or management frame (e.g. trigger or beacon frame) using this DiL session ID is received.

FIG. 11*a* schematically illustrates a communication device 1100, either a non-AP station 101-107 or the access point 110, of the radio network 100, configured to implement at least one embodiment of the present invention. The communication device 1100 may preferably be a device such as a micro-computer, a workstation or a light portable device. The communication device 1100 comprises a communication bus 1113 to which there are preferably connected:

a central processing unit 1101, such as a processor, denoted CPU;

a memory 1103 for storing an executable code of methods or steps of the methods according to embodiments of the invention as well as the registers adapted to record variables and parameters necessary for implementing the methods; and at least one communication interface 1102 connected to a wireless communication network, for example a communication network according to one of the IEEE 802.11 family of standards, via transmitting and receiving antennas 1104.

Preferably the communication bus provides communication and interoperability between the various elements included in the communication device 1100 or connected to it. The representation of the bus is not limiting and in particular the central processing unit is operable to communicate instructions to any element of the communication device 1100 directly or by means of another element of the communication device 1100.

The executable code may be stored in a memory that may either be read only, a hard disk or on a removable digital medium such as for example a disk. According to an optional variant, the executable code of the programs can be received by means of the communication network, via the interface 1102, in order to be stored in the memory of the communication device 1100 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 11*b* is a block diagram schematically illustrating the architecture of the communication device 1100, either the AP 110 or one of stations 101-107, adapted to carry out, at least partially, the invention. As illustrated, device 1100 comprises a physical (PHY) layer block 1123, a MAC layer block 1122, and an application layer block 1121.

The PHY layer block 1123 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 410 (FIG. 4) to reserve a transmission slot, MAC data and management frames (e.g. beacon frames) based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 1122 preferably comprises a MAC 802.11 layer 1124 implementing conventional 802.11ax MAC operations, and additional block 1125 for carrying out, at least partially, the invention. The MAC layer block 1122 may optionally be implemented in software, which software is loaded into RAM 1103 and executed by CPU 1101.

Preferably, the additional block 1125, referred to as Triggered MU Tx management module for triggered MU transmissions following a medium access trigger frame through OFDMA resource units (sub-channels), implements the part of embodiments of the invention (either from station perspective or from AP perspective).

For instance and not exhaustively, the operations for the station (AP or non-AP) may include, at the AP, generating and sending a trigger frame allocating a RU for DiL transmission, sending beacon frames, sending DL-BSRP frames, sending DiL session Id setup and teardown frames, assigning DiL session IDs and at the triggered stations, receiving such frames, sending data frames to another triggered station over an allocated DiL RU, receiving data frames from another triggered station over an allocated DiL RU.

MAC 802.11 layer 1124, Triggered MU Tx management module 1125 interact one with the other in order to process accurately communications over OFDMA RU addressed to multiple stations according to embodiments of the invention.

On top of the Figure, application layer block 1121 runs an application that generates and receives data packets, for example data packets such as a video stream. Application layer block 1121 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for managing stations operating in Direct Link in a wireless network comprising, at a triggering station:
   obtaining a Direct Link, DiL, session identifier identifying a Direct Link transmission session established between triggered stations,
   generating a control or management frame signaling control or management information to the triggered stations using the DiL session identifier, and
   sending the control or management frame to the triggered stations to trigger actions at these stations based on the control or management information;
   wherein the control or management frame includes a beacon frame in which the DiL session identifier is associated with a wake-up flag triggering a waking up of the triggered stations from a doze mode.

2. The method of claim 1, wherein the control or management frame includes a trigger frame to trigger a multi-user, MU, transmission, wherein the trigger frame allocates, using the DiL session identifier, a resource unit of the MU transmission for Direct Link transmission between the triggered stations.

3. The method of claim 1, wherein the beacon frame comprises a traffic indication virtual bitmap associating Association Identifiers, AIDs, each identifying a corresponding non-AP station, with respective flags indicating whether the AP stores data intended for the corresponding non-AP station, and the flag associated with an AID equal to the DiL session identifier is enabled to trigger the waking up of the triggered stations involved in the DiL transmission session.

4. The method of claim 1, further comprising, at the triggering station, receiving, from any of the triggered stations, a buffer status report indicating data to be transmitted to the other triggered station.

5. The method of claim 4, wherein obtaining a DiL session identifier includes generating at least one DiL session identifier responsive to the receipt of the buffer status report.

6. The method of claim 5, wherein obtaining a DiL session identifier includes generating two DiL session identifiers, a first identifier identifying a Direct Link transmission from a first one of the triggered stations to a second one of the triggered stations and a second identifier identifying a Direct Link transmission from the second triggered station to the first triggered station.

7. The method of claim 1, further comprising, at the triggering station prior to sending the control or management frame, sending to the triggered stations a setup message providing the DiL session identifier identifying the Direct Link transmission session established between them.

8. The method of claim 7, further comprising, at the triggering station, sending to the triggered stations a teardown message informing the DiL session identifier no longer identifies the Direct Link transmission session established between them.

9. A method for managing stations operating in Direct Link in a wireless network comprising, at a triggered station:
   receiving, from a triggering station, a control or management frame signaling control or management information to triggered stations using a Direct Link, DiL, session identifier identifying a Direct Link transmission session established between the triggered station and another triggered station, and
   performing a control or management action based on the control or management information;
   wherein the received control or management frame includes a beacon frame in which the DiL session identifier is associated with a wake-up flag, and the method further comprises, at the triggered station, deciding to wake up from a doze mode depending on the wake-up flag.

10. The method of claim 9, wherein the control or management frame includes a trigger frame to trigger a multi-user, MU, transmission, wherein the trigger frame allocates, using the DiL session identifier, a resource unit of the MU transmission for Direct Link transmission between the triggered stations.

11. The method of claim 10, further comprising, at the triggered station, sending a data frame directly to the other triggered station using the resource unit allocated for the Direct Link transmission.

12. The method of claim 10, further comprising, at the triggered station, receiving a data frame directly from the other triggered station over the resource unit allocated for the Direct Link transmission.

13. The method of claim 9, further comprising, at the triggered station, sending, to the triggering station, a buffer status report indicating data to be transmitted to the other triggered station.

14. The method of claim 9, further comprising, at the triggered station prior to receiving the control or management frame, receiving from the triggering station a setup message providing the DiL session identifier identifying the Direct Link transmission session established between them.

15. The method of claim 14, further comprising at the triggered station, receiving from the triggering station a teardown message informing the DiL session identifier no longer identifies the Direct Link transmission session established between it and the other triggered station.

16. A station in a wireless network comprising a microprocessor configured for carrying out the steps of:
   obtaining a Direct Link, DiL, session identifier identifying a Direct Link transmission session established between triggered stations,
   generating a control or management frame signaling control or management information to the triggered stations using the DiL session identifier, and
   sending the control or management frame to the triggered stations to trigger actions at these stations based on the control or management information;
   wherein the control or management frame includes a beacon frame in which the DiL session identifier is associated with a wake-up flag triggering a waking up of the triggered stations from a doze mode.

17. A station in a wireless network comprising a microprocessor configured for carrying out the steps of:
   receiving, from a triggering station, a control or management frame signaling control or management information to triggered stations using a Direct Link, DiL, session identifier identifying a Direct Link transmission session established between the station and another triggered station, and
   performing a control or management action based on the control or management information;

wherein the received control or management frame includes a beacon frame in which the DiL session identifier is associated with a wake-up flag, and the method further comprises, at the triggered station, deciding to wake up from a doze mode depending on the wake-up flag.

18. A non-transitory computer-readable medium storing a program which, when executed by a microprocessor or computer system in a device, causes the device to perform a method for managing stations operating in Direct Link in a wireless network comprising, at a triggering station: obtaining a Direct Link, DiL, session identifier identifying a Direct Link transmission session established between triggered stations, generating a control or management frame signaling control or management information to the triggered stations using the DiL session identifier, and sending the control or management frame to the triggered stations to trigger actions at these stations based on the control or management information, wherein the control or management frame includes a beacon frame in which the DiL session identifier is associated with a wake-up flag triggering a waking up of the tricered stations from a doze mode.

* * * * *